United States Patent
Li et al.

(10) Patent No.: US 9,940,893 B2
(45) Date of Patent: Apr. 10, 2018

(54) HEAD MOUNTED DEVICE CONTROL METHOD AND APPARATUS, AND HEAD MOUNTED DEVICE

(71) Applicant: Huawei Device Co., Ltd., Shenzhen (CN)

(72) Inventors: Guoqing Li, Beijing (CN); Xinmiao Chang, Beijing (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 44 days.

(21) Appl. No.: 15/023,526

(22) PCT Filed: Nov. 27, 2014

(86) PCT No.: PCT/CN2014/092381
§ 371 (c)(1),
(2) Date: Mar. 21, 2016

(87) PCT Pub. No.: WO2015/078387
PCT Pub. Date: Jun. 4, 2015

(65) Prior Publication Data
US 2016/0247480 A1    Aug. 25, 2016

(30) Foreign Application Priority Data

Nov. 28, 2013   (CN) .......................... 2013 1 0627752
Jan. 8, 2014    (CN) .......................... 2014 1 0008649

(51) Int. Cl.
*G09G 5/00* (2006.01)
*G02B 27/01* (2006.01)
(Continued)

(52) U.S. Cl.
CPC .............. *G09G 5/00* (2013.01); *G02B 27/017* (2013.01); *G06F 3/012* (2013.01); *G06F 3/16* (2013.01);
(Continued)

(58) Field of Classification Search
CPC ............... G06F 3/0488; G06F 3/04883; G06F 3/04817; G06F 3/04842
See application file for complete search history.

(56) References Cited

U.S. PATENT DOCUMENTS 8,315,617 B2   11/2012  Tadayon et al.
2002/0136422 A1   9/2002  Renner
(Continued)

FOREIGN PATENT DOCUMENTS

CN          1684500 A      10/2005
CN        101107795 A       1/2008
(Continued)

OTHER PUBLICATIONS

Foreign Communication From a Counterpart Application, PCT Application No. PCT/CN2014/092381, International Search Report dated Feb. 13, 2015, 2 pages.
(Continued)

*Primary Examiner* — Nan-Ying Yang
(74) *Attorney, Agent, or Firm* — Conley Rose, P.C.

(57) ABSTRACT

A head mounted device control method includes capturing situation data, using the situation data to determine whether a wearer of a head mounted device is inside a moving vehicle, and when it is determined that the wearer is inside a moving vehicle, controlling an image capture apparatus in the head mounted device to capture an environmental image, using the captured environmental image to determine whether a seat taken by the wearer is a driver's seat, and when it is determined that the seat taken by the wearer is the driver's seat, disabling a preset service, where the preset service includes a screen display service of a near-eye display. The method may reduce diversion of attention of the wearer, and improve driving safety.

4 Claims, 20 Drawing Sheets

(51) Int. Cl.
*G06F 3/01* (2006.01)
*G06F 3/16* (2006.01)
*G06K 9/00* (2006.01)

(52) U.S. Cl.
CPC .... *G06K 9/00838* (2013.01); *G02B 2027/014* (2013.01); *G09G 2340/14* (2013.01)

(56) References Cited

U.S. PATENT DOCUMENTS

| | | |
|---|---|---|
| 2004/0001588 A1 | 1/2004 | Hairston |
| 2005/0231599 A1* | 10/2005 | Yamasaki ................ G02B 3/14 348/207.99 |
| 2009/0309751 A1 | 12/2009 | Kano et al. |
| 2011/0105082 A1 | 5/2011 | Haley |
| 2011/0219080 A1* | 9/2011 | McWithey ........ H04M 1/72552 709/206 |
| 2013/0147686 A1 | 6/2013 | Clavin et al. |

FOREIGN PATENT DOCUMENTS

| | | |
|---|---|---|
| CN | 102754412 A | 10/2012 |
| WO | 2011109028 A1 | 9/2011 |

OTHER PUBLICATIONS

Foreign Communication From a Counterpart Application, PCT Application No. PCT/CN2014/092381, Written Opinion dated Feb. 13, 2015, 6 pages.
Foreign Communication From a Counterpart Application, European Application No. 14865292.8, Partial Supplementary European Search Report dated Aug. 9, 2016, 7 pages.
Foreign Communication From a Counterpart Application, PCT Application No. PCT/CN2014/092381, English Translation of International Search Report dated Feb. 13, 2015, 2 pages.
Foreign Communication From a Counterpart Application, PCT Application No. PCT/CN2014/092381, English Translation of Written Opinion dated Feb. 13, 2015, 19 pages.

* cited by examiner

US 9,940,893 B2

HEAD MOUNTED DEVICE CONTROL METHOD AND APPARATUS, AND HEAD MOUNTED DEVICE

CROSS-REFERENCE TO RELATED APPLICATIONS

This application is a U.S. National Stage of International Application No. PCT/CN2014/092381, filed on Nov. 27, 2014, which claims priority to Chinese Patent Application No. 201410008649.8, filed on Jan. 8, 2014, and claims priority to Chinese Patent Application No. 201310627752.6, filed on Nov. 28, 2013, all of which are hereby incorporated by reference in their entireties.

TECHNICAL FIELD

The present disclosure relates to the field of data processing technologies, and in particular, to a head mounted device control method and apparatus, and a head mounted device.

BACKGROUND

A head mounted device is an electronic device that is worn on a user's head and has an independent central processing unit (CPU), storage unit, communications module, and near-eye display. During use, the head mounted device needs to be worn on the user's head.

A typical head mounted device generally has a network access capability, and may send and receive data, and provide various services for a wearer, for example, such services as electronic newspaper, map, incoming call alert, electronic mail (e-mail) alert, short message service (SMS) alert, and social network message update. These services are displayed on the near-eye display of the head mounted device. That is, the head mounted device provides a screen display service for its wearer using the near-eye display.

When the wearer is driving a vehicle, using the head mounted device, especially using the screen display service provided by the head mounted device, will divert attention of the wearer, and cause a potential safety risk. Therefore, how to restrict use of the head mounted device especially the screen display service, when the wearer is driving a vehicle has become a hot research direction of the head mounted device.

SUMMARY

In view of this, objectives of embodiments of the present disclosure are to provide a head mounted device control method and apparatus, and a head mounted device to solve the foregoing problem.

To achieve the foregoing objectives, the embodiments of the present disclosure provide the following technical solutions.

According to a first aspect of the embodiments of the present disclosure, a head mounted device control method is provided, including capturing situation data, where the situation data includes at least one type of moving speed data, signal strength data of a vehicle mounted wireless network, user schedule data, and environmental noise strength data, using the situation data to determine whether a wearer of the head mounted device is inside a moving vehicle. If it is determined that the wearer is inside a moving vehicle, controlling an image capture apparatus in the head mounted device to capture an environmental image, using the captured environmental image to determine whether a seat taken by the wearer is a driver's seat, and if it is determined that the seat taken by the wearer is the driver's seat, disabling a preset service, where the preset service includes a screen display service of a near-eye display.

With reference to the first aspect, in a first possible implementation manner, the method further includes, if it is determined that the seat taken is not the driver's seat, or if it is determined that the wearer is not inside a moving vehicle, enabling or retaining the preset service.

With reference to the first possible implementation manner of the first aspect, in a second possible implementation manner, the method further includes substituting the situation data into a situation evaluation function to obtain a situation evaluation value, and the using the situation data to determine whether the wearer is inside a moving vehicle includes determining whether the situation evaluation value is greater than or equal to a threshold, and if the situation evaluation value is greater than or equal to the threshold, determining that the wearer is inside a moving vehicle, or if the situation evaluation value is less than the threshold, determining that the wearer is not inside a moving vehicle.

With reference to the second possible implementation manner of the first aspect, in a third possible implementation manner, the situation evaluation function is denoted by $F(x, y, z, v)$ and includes at least one of a signal strength evaluation function $f_1(x)$, a schedule evaluation function $f_2(y)$, an environmental noise evaluation function $f_3(z)$, and a moving speed evaluation function $f_4(v)$, where x indicates the signal strength data, y indicates the user schedule data, z indicates an environmental noise strength evaluation value, and v indicates the moving speed data, and the substituting the situation data into a situation evaluation function to obtain the situation evaluation value includes at least one of the following: substituting x into $f_1(x)$ to obtain a signal strength evaluation value, substituting y into $f_2(y)$ to obtain a schedule evaluation value, substituting z into $f_3(z)$ to obtain an environmental noise strength evaluation value, and substituting v into $f_4(v)$ to obtain a moving speed evaluation value.

With reference to the third possible implementation manner of the first aspect, in a fourth possible implementation manner, $$f_1(x) = \alpha_1 x,$$

where $\alpha_1$ indicates a signal strength weight, and $\alpha_1 > 0$, $$f_2(y) = \begin{cases} 0, & y \cap \Omega = \emptyset \\ \alpha_2, & y \cap \Omega \neq \emptyset \end{cases},$$

where $\alpha_2$ indicates a schedule weight and $\alpha_2 > 0$, y includes a schedule event set at a data capture time, and $\Omega$ indicates a preset specific event set, $$f_3(z) = \alpha_3 z,$$

where $\alpha_3$ indicates an environmental noise strength weight, and $\alpha_3 > 0$, and $$f_4(v) = \begin{cases} \beta_1 v + t_1, & v < v_0 \\ \beta_2 v + t_2, & v \geq v_0 \end{cases},$$

where $v_0$ indicates a speed threshold, $\beta_1$ indicates a first moving speed weight, $\beta_2$ indicates a second moving speed weight, $t_1$ indicates a first speed minimum impact value, $t_2$ indicates a second speed minimum impact value, $\beta_2 \geq \beta_1 > 0$, and $t_2 \geq t_1 > 0$.

With reference to the first aspect, in a fifth possible implementation manner, the capturing an environmental image includes setting photographing parameters and performing photographing to obtain the environmental image, where the photographing parameters are determined according to the moving speed data, or the photographing parameters are preset standard photographing parameters.

With reference to the fifth possible implementation manner of the first aspect, in a sixth possible implementation manner, the using the captured environmental image to determine whether a seat taken by the wearer is a driver's seat includes detecting whether the environmental image includes a preset mark, and if it is detected that the preset mark is included, determining that the seat taken by the wearer is the driver's seat, or if it is detected that the preset mark is not included, determining that the seat taken by the wearer is not the driver's seat, or calculating a similarity between the captured environmental image and a preset standard environmental image, and if the similarity obtained through calculation is greater than or equal to a similarity threshold, determining that the seat taken by the wearer is the driver's seat, or else, determining that the seat taken by the wearer is not the driver's seat.

With reference to the fifth or sixth possible implementation manner of the first aspect, in a seventh possible implementation manner, the photographing parameters include an exposure time, a reciprocal F of a ratio of an aperture diameter to a focal length of a lens, a sensitivity, and a selected focus.

With reference to the first aspect, in an eighth possible implementation manner, the method further includes, after detecting a connection to the vehicle mounted wireless network, sending device information of a wearable device that has been connected to the head mounted device, to a vehicle mounted system to which the vehicle mounted wireless network belongs such that the vehicle mounted system performs a search according to the acquired device information and establishes a connection with the wearable device that is searched out, or when detecting a disconnection from the vehicle mounted wireless network, searching for a wearable device that established a connection with the head mounted device, and reestablishing a connection with the wearable device that is searched out.

With reference to the first aspect, in a ninth possible implementation manner, the preset service further includes at least one of a manual input service and a projection and display service.

With reference to the first aspect, in a tenth possible implementation manner, the method further includes, if it is determined that the seat taken is the driver's seat, converting information received or coming from a preset emergency contact into speech information for playing.

With reference to the first aspect, in an eleventh possible implementation manner, the method further includes, if it is determined that the seat taken is the driver's seat, pushing the screen display service to a display screen other than the head mounted device.

According to a second aspect of the embodiments of the present disclosure, a head mounted device control apparatus is provided, including a situation data capture unit configured to capture situation data, where the situation data includes at least one type of moving speed data, signal strength data of a vehicle mounted wireless network, user schedule data, and environmental noise strength data, a first determining unit configured to use the situation data to determine whether a wearer of the head mounted device is inside a moving vehicle, an image capture control unit configured to control, when it is determined that the wearer is inside a moving vehicle, an image capture apparatus in the head mounted device to capture an environmental image, a second determining unit configured to use the captured environmental image to determine whether a seat taken by the wearer is a driver's seat, and a service management unit configured to disable a preset service when it is determined that the seat taken by the wearer is the driver's seat, where the preset service includes a screen display service of a near-eye display.

With reference to the second aspect, in a first possible implementation manner, the apparatus further includes a first connecting unit configured to send, after a connection to the vehicle mounted wireless network is detected, device information of a wearable device that has been connected to the head mounted device, to a vehicle mounted system to which the vehicle mounted wireless network belongs such that the vehicle mounted system performs a search according to the acquired device information and establishes a connection with the wearable device that is searched out, and a second connecting unit configured to search, when a disconnection from the vehicle mounted wireless network is detected, for a wearable device that established a connection with the head mounted device, and reestablish a connection with the wearable device that is searched out.

With reference to the second aspect, in a second possible implementation manner, the apparatus further includes a converting unit configured to convert, when it is determined that the seat taken is the driver's seat, information received or coming from a preset emergency contact into speech information for playing.

With reference to the second aspect, in a third possible implementation manner, the apparatus further includes a pushing unit configured to push, when it is determined that the seat taken is the driver's seat, the screen display service to a display screen other than the head mounted device.

According to a third aspect of the embodiments of the present disclosure, a head mounted device is provided and includes an image capture apparatus, a near-eye display, and the head mounted device control apparatus according to any one of the second aspect to the third possible implementation manner of the second aspect, where the head mounted device control apparatus is connected to the image capture apparatus and the near-eye display separately.

As may be seen, in the embodiments of the present disclosure, whether a wearer is inside a moving vehicle is determined according to captured situation data. If it is determined that the wearer is inside a moving vehicle, an environmental image is captured for further determining whether a seat taken by the wearer is a driver's seat, and if it is determined that the seat taken by the wearer is the driver's seat, it is considered that the wearer is driving, and a screen display service of a head mounted device is disabled to reduce diversion of attention of the wearer and improve driving safety.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in this specification. The described embodiments are merely some rather than all of the embodiments of the present disclosure. All other embodiments obtained by a person of ordinary skill in the art based on the embodiments of the present disclosure without creative efforts shall fall within the protection scope of the present disclosure.

Figure 1:
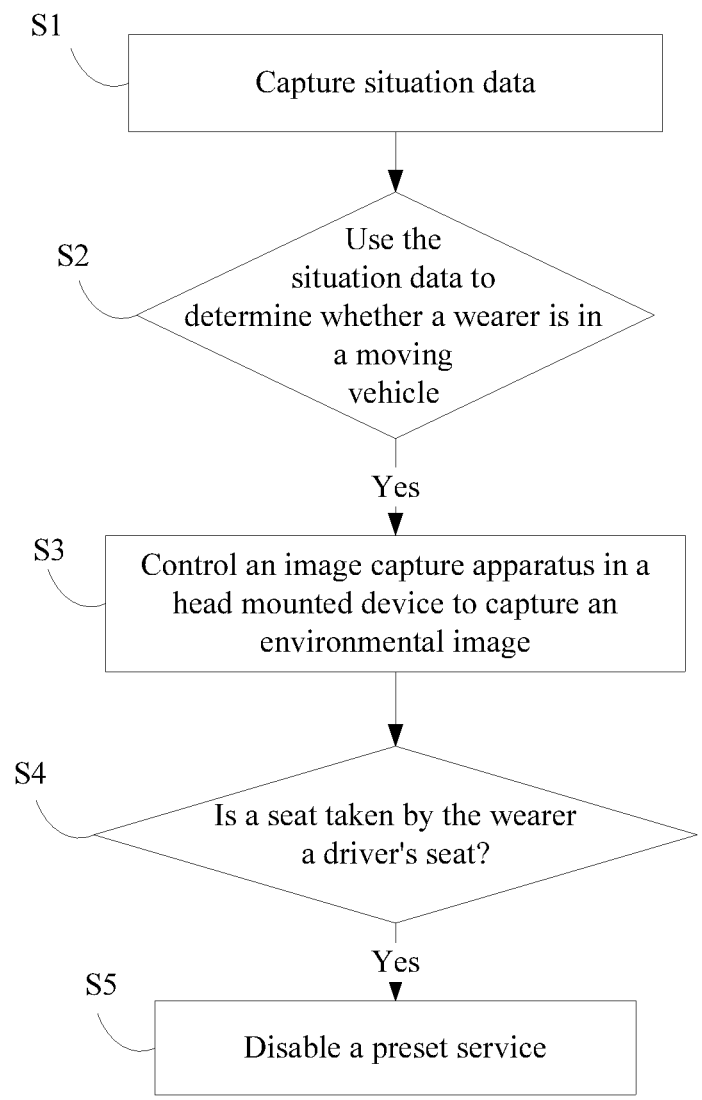
FIG. 1 is a flowchart of a head mounted device control method according to an embodiment of the present disclosure.

Refer to FIG. 1, which is a flowchart of a head mounted device control method according to the present disclosure. The method may include at least the following steps.

Step S1: Capture situation data.

The situation data may include at least one type of moving speed data v, signal strength data x of a vehicle mounted wireless network, user schedule data y, and environmental noise strength data z.

Step S2: Use the situation data to determine whether a wearer of a head mounted device is inside a moving vehicle.

Step S3: If it is determined that the wearer is inside a moving vehicle, control an image capture apparatus in the head mounted device to capture an environmental image.

Furthermore, the image capture apparatus is generally a camera. That is, when it is determined that the wearer is inside a moving vehicle, the camera is used to perform photographing. A more detailed introduction about how an environmental image is captured is provided later in the specification.

Step S4: Use the captured environmental image to determine whether a seat taken by the wearer is a driver's seat.

Step S5: If it is determined that the seat taken is the driver's seat (that is, it is determined that the wearer is in a driving state), disable a preset service, where the preset service may include a screen display service of a near-eye display.

When driving, the driver is in the driver's seat. Therefore, under a prerequisite that it is determined that the wearer is inside a moving vehicle, if it is determined that the wearer is also in the driver's seat, it can be determined that the wearer is driving the vehicle. In this case, the preset service should be disabled.

As may be seen, in the embodiments of the present disclosure, whether a wearer is inside a moving vehicle is determined according to captured situation data. If it is determined that the wearer is inside a moving vehicle, an environmental image is captured for further determining whether a seat taken by the wearer is a driver's seat, and if it is determined that the seat taken by the wearer is the driver's seat, it is considered that the wearer is driving, and a screen display service of a head mounted device is disabled to reduce diversion of attention of the wearer and improve driving safety. It should be noted that, by disabling a screen display service of a near-eye display, all services that need to use the near-eye display of the head mounted device may be disabled. For example, displaying of e-mail alerts, navigation alerts, SMS alerts, and social network messages on the screen of the near-eye display may be forbidden, video call access is forbidden (because a video needs to be displayed on the screen during a video call), and browsing of various picture websites and video streaming websites is forbidden.

Generally, the head mounted device is provided with a touchpad and a button. The wearer may interact with the head mounted device by touching the touchpad or by pressing or toggling the button. However, touching, pressing, toggling, and the like may also divert attention of the wearer.

Therefore, in other embodiments of the present disclosure, in addition to the screen display service of the near-eye display, the preset service in all the foregoing embodiments may further include a manual input service.

More further, the manual input service may include manual inputs using the touchpad and the button.

In other embodiments of the present disclosure, when it is determined that the wearer is in the driving state, the control method in all the foregoing embodiments may further include converting information received or coming from a preset emergency contact into speech information for playing.

An emergency contact list may be maintained in the head mounted device, where all contacts in the list are preset emergency contacts.

More further, the foregoing information may include at least one of an e-mail subject and an SMS message. When the e-mail or SMS message coming from the preset emergency contact is received, the e-mail subject or SMS message may be converted into a speech for playing to the wearer.

In other embodiments of the present disclosure, when it is determined that the wearer is in the driving state, the control method in all the foregoing embodiments may further include pushing the screen display service to a display screen other than the head mounted device. For example, the screen display service may be pushed to a display screen of a vehicle mounted system or a terminal of a passenger in the same vehicle for playing.

Figure 2:
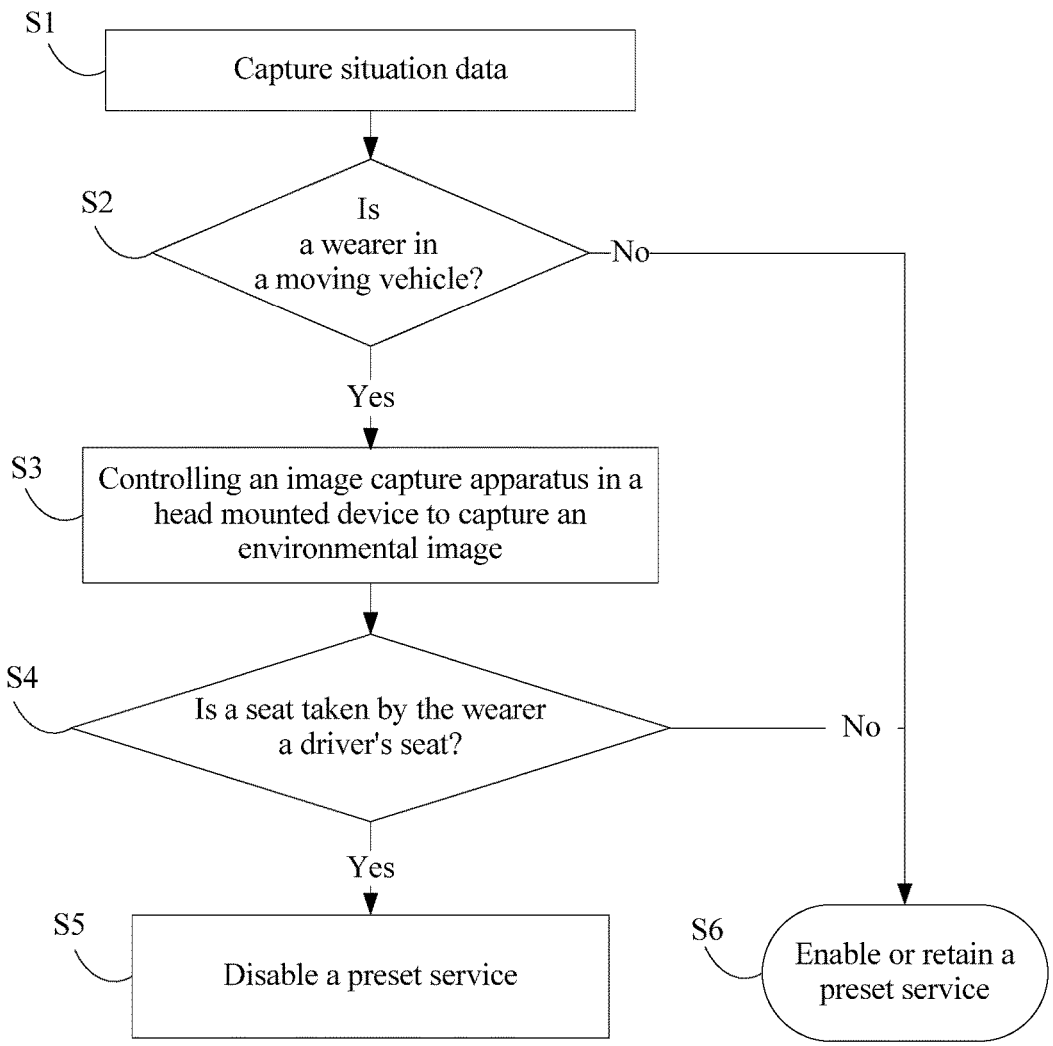
FIG. 2 is another flowchart of a head mounted device control method according to an embodiment of the present disclosure.

In other embodiments of the present disclosure, referring to FIG. 2, the method may further include the following step.

Step S6: If it is determined that the seat taken is not the driver's seat, or if it is determined that the wearer is not inside a moving vehicle, enable or retain the preset service.

It should be noted that, that the wearer is not inside a moving vehicle may correspond to two cases. One case is that the wearer is outside a vehicle. One case is that the wearer is inside a motionless vehicle (for example, the vehicle is always not in a moving state, or the vehicle stops moving at a red traffic light). In these two cases, the wearer is not driving the vehicle, and naturally it is unnecessary to disable the preset service.

That the seat taken by the wearer is not the driver's seat may correspond to the following case. The wearer is inside a moving vehicle, but the wearer is a passenger inside the vehicle instead of the driver. In this case, the wearer is not driving the vehicle, and it is unnecessary to disable the preset service.

The following introduces in detail how the situation data is used to determine whether the wearer is inside a moving vehicle.

Figure 3:
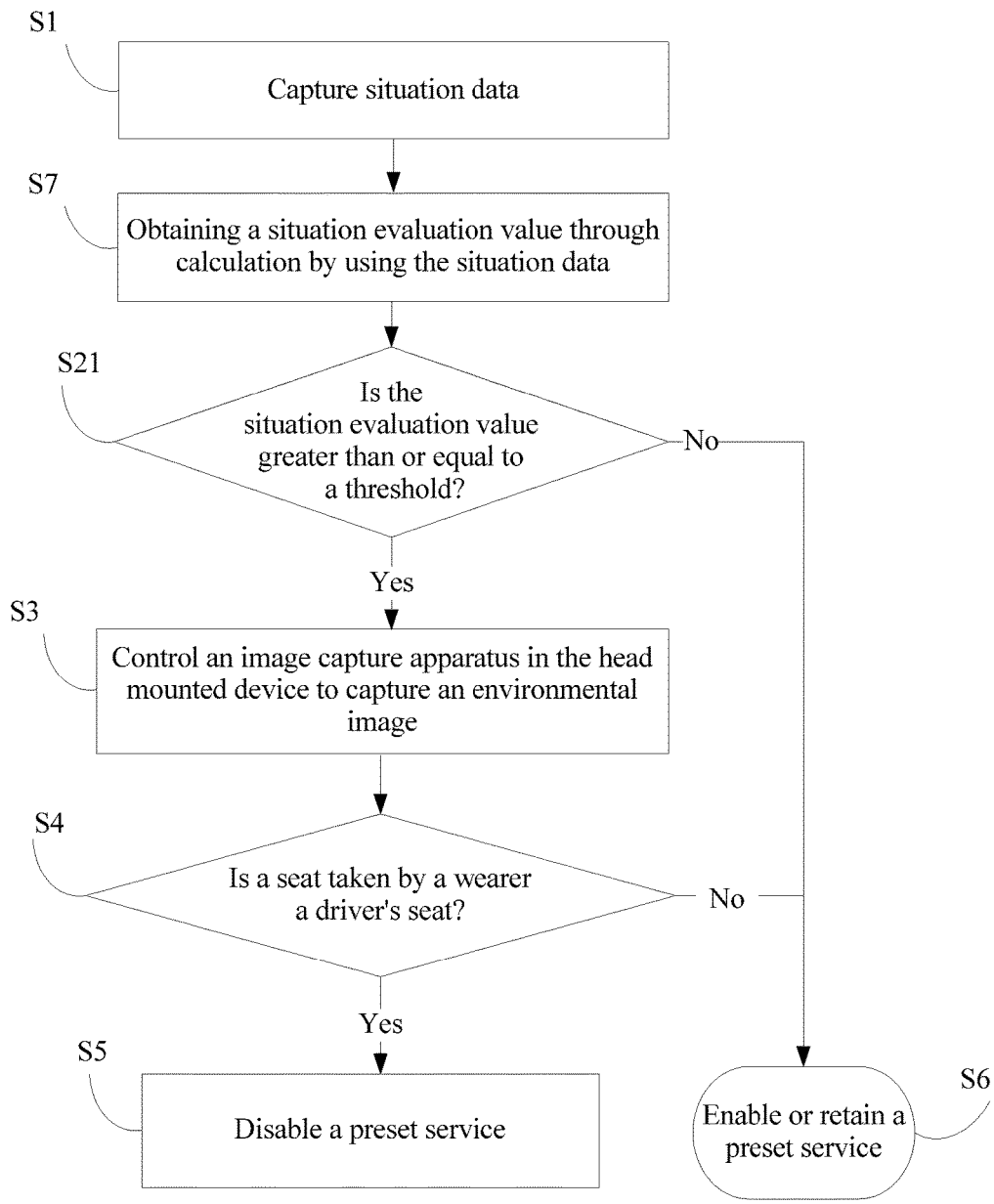
FIG. 3 is still another flowchart of a head mounted device control method according to an embodiment of the present disclosure.

In other embodiments of the present disclosure, referring to FIG. 3, the method in all the foregoing embodiments may further include the following step.

Step S7: Obtain a situation evaluation value through calculation according to the situation data.

Whether the wearer is inside a moving vehicle may be determined according to the situation evaluation value. For example, whether the wearer is inside a moving vehicle may be determined according to whether the situation evaluation value is greater than or equal to a threshold.

Therefore, still referring to FIG. 3, step S2 may further include step S21: Determine whether the situation evaluation value is greater than or equal to a threshold, and if the situation evaluation value is greater than or equal to the threshold, determine that the wearer is inside a moving vehicle, or if the situation evaluation value is less than the threshold, determine that the wearer is not inside a moving vehicle.

For the threshold, an initial value of the threshold may be set to "2" or "3". In addition, with respect to different thresholds, user feedbacks may be received, correctness of determining performed using the thresholds is checked, and finally, an optimum threshold is selected.

In other embodiments of the present disclosure, the control method in all the foregoing embodiments may further include the following step. When a restart condition is satisfied, restarting the image capture apparatus in the head mounted device to capture an environmental image and perform a subsequent determining operation.

The restart condition may include at least one of the following, A situation that the wearer is in changes, for example, the situation changes from being inside a moving vehicle to not being inside a moving vehicle (for example, the wearer leaves a vehicle, or the vehicle changes from moving situation to stopped situation), and the situation changes from not being inside a moving vehicle to being inside a moving vehicle (for example, the wearer enters a vehicle, or the vehicle changes from stopped situation to moving situation).

Furthermore, a comparison may be made between a situation evaluation value (F1) obtained through calculation at a current time and a situation evaluation value (F0) obtained through calculation at a previous time to determine whether the restart condition is satisfied. When F0 is less than the threshold but F1 is greater than or equal to the threshold, or when F0 is greater than or equal to the threshold but F1 is less than or equal to the threshold, it is determined that the situation that the wearer is in changes.

Figure 4:
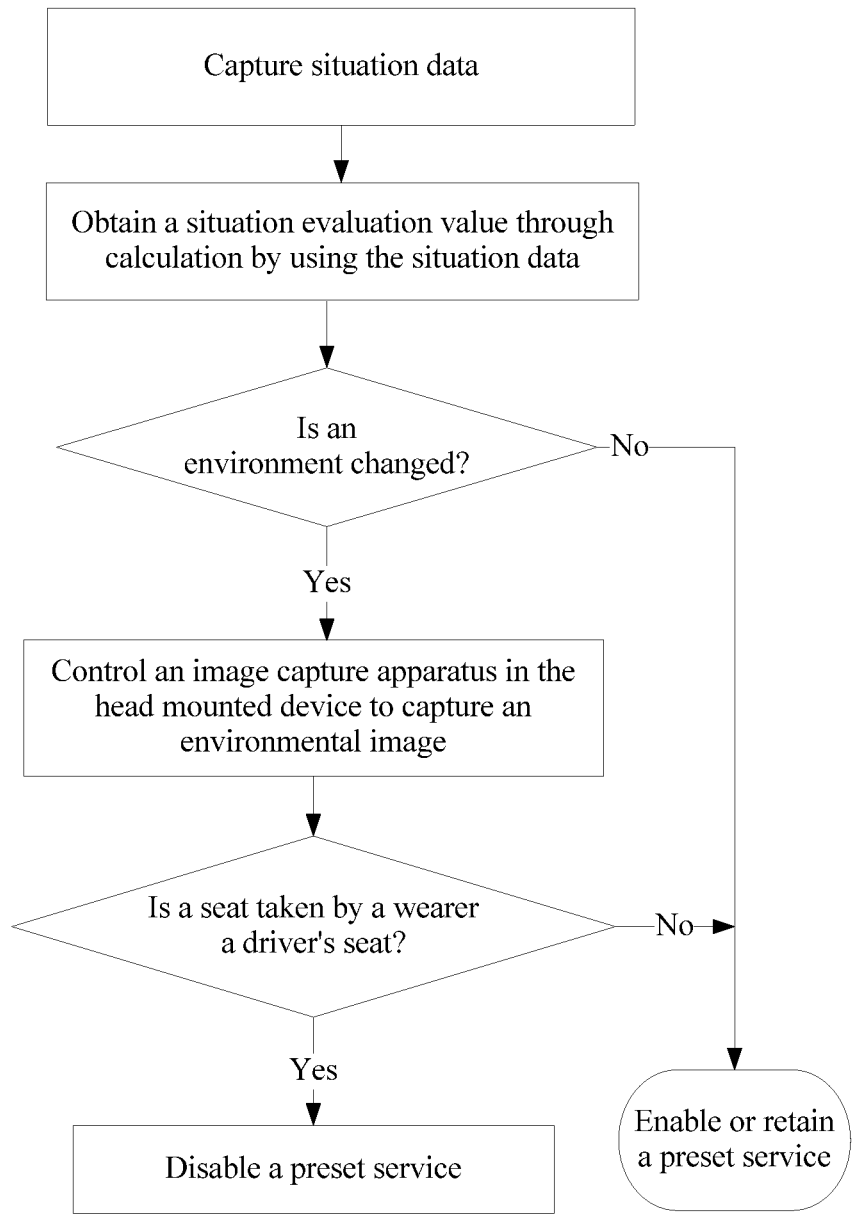
FIG. 4 is still another flowchart of a head mounted device control method according to an embodiment of the present disclosure.
Figure 5:
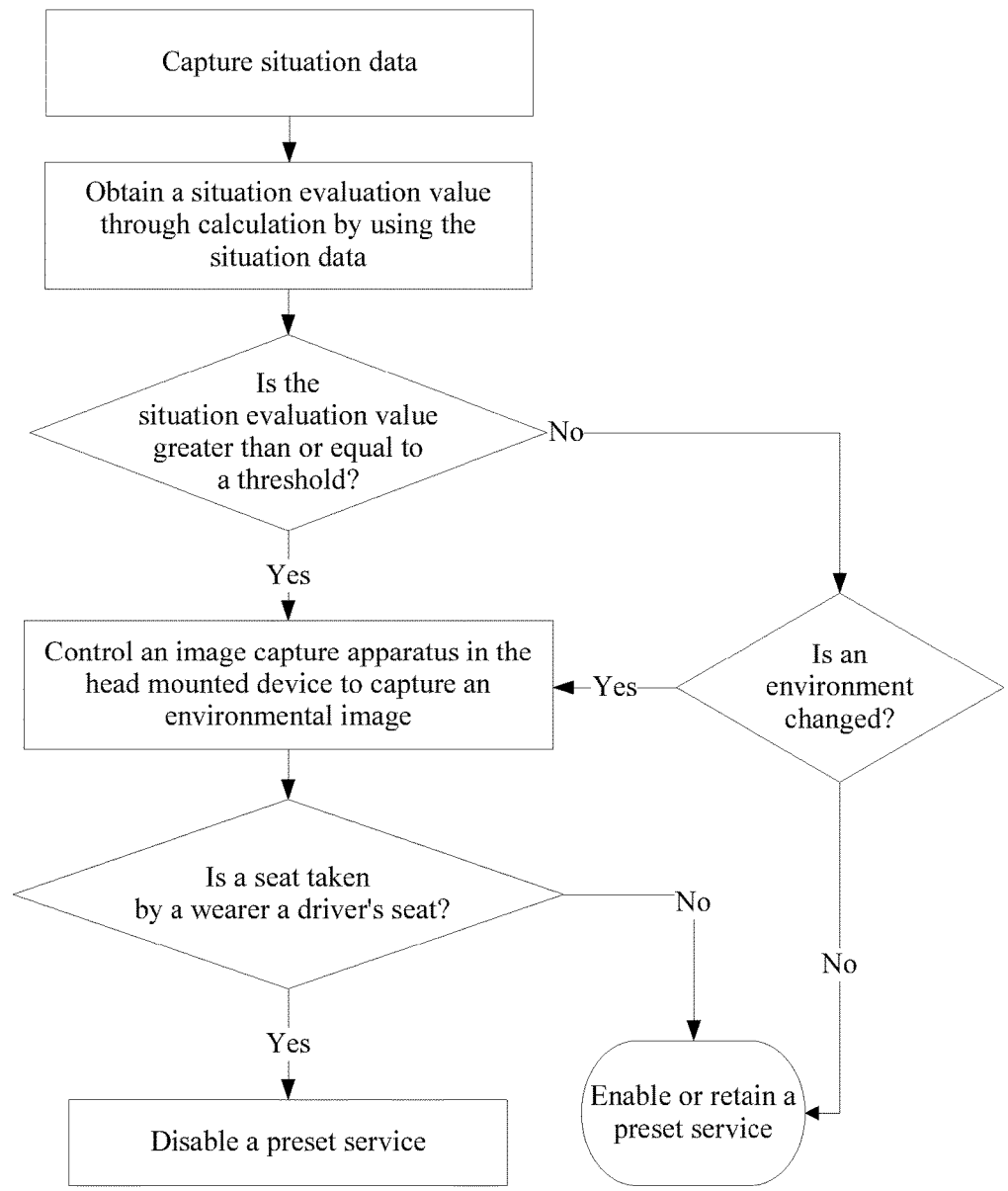
FIG. 5 is still another flowchart of a head mounted device control method according to an embodiment of the present disclosure.

Based on the situation evaluation value, the flowchart of the foregoing control method may further be as shown in FIG. 4 and FIG. 5.

In other embodiments of the present disclosure, the foregoing step S7 may further include substituting the situation data into a situation evaluation function to obtain a situation evaluation value.

Furthermore, the situation evaluation function may include at least one of a signal strength evaluation function $f_1(x)$, a schedule evaluation function $f_2(y)$, an environmental noise evaluation function $f_3(z)$, and a moving speed evaluation function $f_4(v)$, where x indicates the signal strength data, y indicates the user schedule data, z indicates an environmental noise strength evaluation value, and v indicates the moving speed data.

The situation evaluation function may be denoted by F(x, y, z, v).

In other embodiments of the present disclosure, the "substitute the situation data into a situation evaluation function to obtain a situation evaluation value" may include at least one of the following: substituting x into $f_1(x)$ to obtain a signal strength evaluation value, substituting y into $f_2(y)$ to obtain a schedule evaluation value, substituting z into $f_3(z)$ to obtain an environmental noise strength evaluation value, and substituting v into $f_4(v)$ to obtain a moving speed evaluation value.

More further, $F(x, y, z, v) = f_1(x) + f_2(y) + f_3(z) + f_4(v)$. In this case, the situation evaluation value is equal to a sum of the signal strength evaluation value, the schedule evaluation value, the schedule evaluation value, and the moving speed evaluation value.

The following introduces each function in detail.

I. Signal Strength Evaluation Function $f_1(x)$ may have multiple expressions, for example, $f_1(x) = \alpha_1 x$, where $\alpha_1$ indicates a signal strength weight, $\alpha_1 > 0$, and x indicates a detected signal strength of the vehicle mounted wireless network (WiFi or other wireless communications networks).

x may be captured by a vehicle mounted wireless network connecting module (for example, a WiFi module) in the head mounted device or by an external device (for example, a mobile phone). A greater x value indicates that the head mounted device is more possibly inside a vehicle.

More further, x=90+P, where P indicates an actual signal strength, a value range of P is [−90 decibel-milliwatts (dBm), 0 dBm], and $\alpha_1 = 1/90$.

x=90+P, and a value of $\alpha_1$ is obtained according to the following assumption.

It is assumed that a weakest signal strength that can be detected far away from a vehicle is −90 dBm, while a signal strength of the user inside a vehicle is 0 dBm, that is, an actual range of signal strengths that can be detected is (−90 dBm, 0 dBm). Then, after normalization processing, assuming x=90+P and $\alpha_1 = 1/90$, a value range of $f_1(x)$ is [0, 1].

Certainly, x=90+P and $\alpha_1 = 1/90$ are only one of examples provided in the embodiments. A person skilled in the art may perform a flexible setting according to an actual situation, for example, assume $\alpha_1 = 1/180$, and assume x=180+P.

II. Schedule Evaluation Function $f_2(y)$ may have multiple expressions, for example, $$f_2(y) = \begin{cases} 0, & y \cap \Omega = \emptyset \\ \alpha_2, & y \cap \Omega \neq \emptyset \end{cases},$$

where, $\alpha_2$ indicates a schedule weight and $\alpha_2 > 0$, y includes a schedule event set at a data capture time, and $\Omega$ indicates a preset specific event set.

y may be captured and provided by a schedule module in the head mounted device.

Furthermore, the schedule event set at the data capture time is a set of schedule events that fall within a sampling window. A start time of the sampling window is the data capture time, and duration of the sampling window may be 2 hours, 1 hour, 30 minutes, 40 minutes, or the like.

The preset specific event may include at least one of: meeting, working, and communicating. Events included in the preset specific event set may be defined by the user.

The following provides a specific example. It is assumed that a schedule of user A on Sep. 17, 2013 is arranged as follows:

08:30-9:30: having breakfast in hotel B,
10:50-12:00: having a meeting in building C,
12:00-13:00: having lunch with Mr. Y,
14:00-15:00: communicating with Mr. H in building D,
15:00-18:00: working, and
18:30-19:00: shopping food at supermarket E.

User A defines a preset event set $\Omega$={meeting, working, and communicating}, and sets a sampling window to one hour.

Assuming that y (9:30) is a schedule event set captured at 9:30 a.m. on Sep. 17, 2013, because there is nothing to do from 9:30 to 10:30 in the schedule, y (9:30)=0, and $f_2$ (y (9:30))=0.

Assuming that y (10:00) is a schedule event set at 10:00 a.m. on Sep. 17, 2013, including "having a meeting in building C", an intersection between the schedule event set and $\Omega$ is "meeting", and $f_2$ (y (10:00))=$\alpha_2$.

Further, $\alpha_2$ may be set to 1. $\alpha_2$ may also be set by the user, which is not further described herein.

III. Environmental Noise Evaluation Function $f_3(z)$ may have multiple expressions, for example, $f_3(z) = \alpha_3 z$, where, $\alpha_3$ indicates an environmental noise strength weight, $\alpha_3 > 0$, and z indicates an environmental noise strength.

An environmental noise may be captured by a microphone in the head mounted device or by an external dedicated sound capture apparatus.

Furthermore, a manner of capturing the environmental noise strength data may include:

Step 1: Perform spectrum analysis on captured sound to obtain spectral components.

Step 2: In the spectral components obtained through spectrum analysis, search for an environmental noise spectral component.

Step 3: Acquire a sound intensity of the environmental noise spectral component that is searched out.

The environmental noise includes at least one of brake noise, motor noise, and road noise.

Correspondingly, the environmental noise spectral component may include at least one of a brake noise spectral component, a motor noise spectral component, and a road noise spectral component.

Before step 1, typical brake noise, motor noise, and road noise may be captured in advance using a dedicated sound intensity or sound pressure capture apparatus, spectrum analysis is performed, and spectral characteristics of the noises are recorded.

In step 1, after sound is captured, spectrum analysis is performed, and a spectral characteristic of each spectral component is obtained. By comparing the spectral characteristics, whether a brake noise spectral component, a motor noise spectral component, and a road noise spectral component are included may be determined.

Using an environmental noise spectral component including a brake noise spectral component, a motor noise spectral component, and a road noise spectral component as an example, the "acquire a sound intensity of the environmental noise spectral component that is searched out" may include using a maximum value in a sound intensity of the brake noise spectral component, a sound intensity of the motor noise spectral component, and a sound intensity of the road noise spectral component as the sound intensity of the environmental noise spectral component.

It is assumed that spectrum analysis is performed on the captured sound, and five spectral components are obtained. The five spectral components include a motor noise spectral component and a road noise spectral component, but do not include a brake noise spectral component. Therefore, according to a spectrum analysis result, a sound intensity of the motor noise spectral component and a sound intensity of the road noise spectral component are obtained through calculation. How to perform calculation is prior art, and is not further described herein. A maximum value is selected from the sound intensity of the motor noise spectral component and the sound intensity of the road noise spectral component, and used as the sound intensity of the environmental noise spectral component.

Alternatively, the "acquire a sound intensity of the environmental noise spectral component that is searched out" may include calculating a sound intensity z1 of the brake noise spectral component, a sound intensity z2 of the motor noise spectral component, and a sound intensity z3 of the road noise spectral component, and obtaining a sound intensity z of the environmental noise spectral component through calculation according to a formula z=A*z1 +B*z2 +C*z3.

A is a sound intensity weight of the brake noise spectral component, B is a sound intensity weight of the motor noise spectral component, and C is a sound intensity weight of the road noise spectral component. A person skilled in the art may set the weights according to an actual situation. For example, brake noise is not an event that frequently occurs, and therefore, its weight is set to a small value.

Likewise, a person skilled in the art may set a value of $\alpha_3$ according to an actual situation. For example, after measurement, it is found that a decibel value range of z is [0, 60]. Therefore, $\alpha_3$=1/60, and a value range of $f_3(z)$ is assumed to be [0,1]. Certainly, $\alpha_3$ may also be set to other values, for example, 1/70 and 1/90.

IV. Moving Speed Evaluation $f_4(v)$ may have multiple expressions, for example, $$f_4(v) = \begin{cases} \beta_1 v + t_1, & v < v_0 \\ \beta_2 v + t_2, & v \geq v_0 \end{cases},$$

where $v_0$ indicates a speed threshold, $\beta_1$ indicates a first moving speed weight, $\beta_2$ indicates a second moving speed weight, $t_1$ indicates a first speed minimum impact value, $t_2$ indicates a second speed minimum impact value, $\beta_2 \geq \beta_1 > 0$, and $t_2 \geq t_1 > 0$.

v may be captured and calculated by a global positioning system (GPS) module or an accelerometer in the head mounted device, or may be provided by the vehicle mounted system directly.

$v_0$ is a speed threshold. If this threshold is exceeded, a higher speed indicates that the user is more possibly inside a moving vehicle.

More further, $v_0$=30 kilometer (km)/hour (h), $\beta_1$=1/90, $t_1$=0.01, $\beta_2$=1/60, and $t_2$=0.1. Assuming that a value range of v is [0,120], a value range of $f_4(v)$ is [0.01,2.1].

Certainly, a person skilled in the art may flexibly set values of $v_0$, $\beta_1$, $\beta_2$, $t_1$, and $t_2$, which is not further described herein.

The following introduces capturing of an environmental image.

In other embodiments of the present disclosure, the capturing an environmental image may include: setting photographing parameters and performing photographing to obtain the environmental image, where the photographing parameters may be set according to v, or the photographing parameters are preset standard photographing parameters (that is, the photographing parameters are set to the preset standard photographing parameters).

More further, the photographing parameters may include an exposure time, a reciprocal F of a ratio of an aperture diameter to a focal length of a lens, a sensitivity, and a selected focus.

The photographing parameters may be set according to the moving speed data v in multiple manners. For example, when $v_1 < v < v_2$, it is determined that the exposure time is 1/64second, and that F is 4, and that the sensitivity is ISO400. When $v_2 < v < v_3$, it is determined that the exposure time is 1/32second, and that F is 2.8, and that the sensitivity is ISO140.

Figure 6:
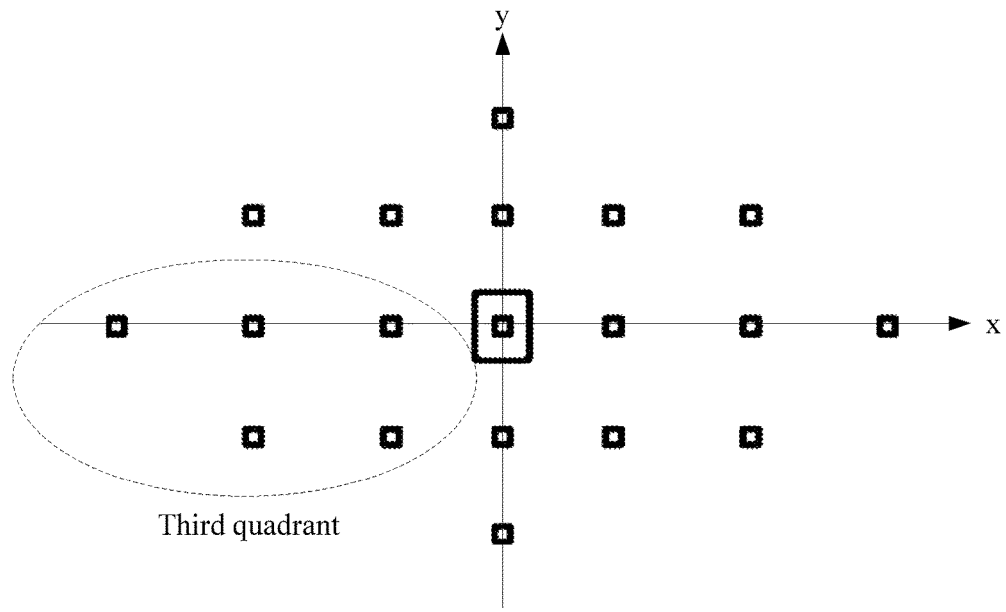
FIG. 6 is a schematic diagram of selecting a focus according to an embodiment of the present disclosure.
Figure 7:
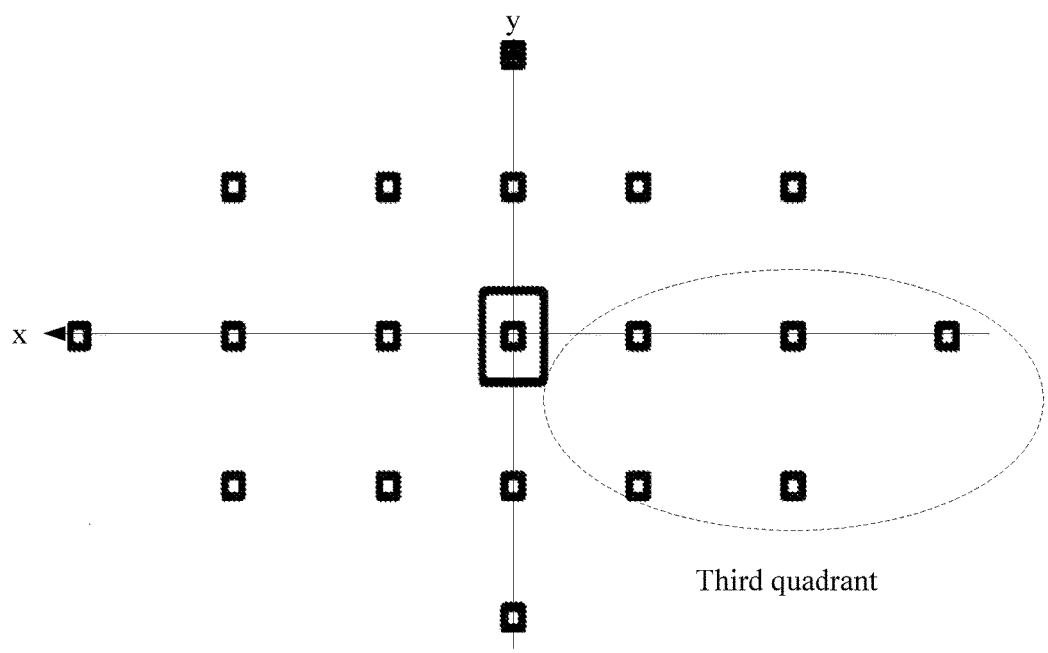
FIG. 7 is another schematic diagram of selecting a focus according to an embodiment of the present disclosure.

Referring to FIG. 6 or FIG. 7, the selected focus may include a focus located in a third quadrant and a focus located on a negative half-axis of an x-axis, in a cartesian coordinate system using a picture center (a picture observed by the wearer of the head mounted device) as an origin, using a horizontal direction as an x-axis direction, and using a vertical direction as a y-axis direction.

Certainly, the foregoing is only a specific example provided in the embodiments. A person skilled in the art may design, according to an actual situation, how the photographing parameters are set, which is not further described herein.

A manner of acquiring the preset standard photographing parameters may be as follows.

The user actively triggers the camera in the head mounted device to perform photographing, where an image captured is used as a standard environmental image, and photographing parameters used for capturing the standard environmental image are saved as the standard photographing parameters.

Afterward, when the camera is started to perform photographing, the photographing parameters are automatically adjusted to the standard photographing parameters for photographing.

The following introduces how it is determined whether the seat taken by the wearer is a driver's seat.

In other embodiments of the present disclosure, step S4 in all the foregoing embodiments of the present disclosure may include, detecting whether the captured environmental image includes a preset mark, and if it is detected that the preset mark is included, determining that the seat taken by the wearer is the driver's seat, or if it is detected that the preset mark is not included, determining that the seat taken by the wearer is not the driver's seat.

Furthermore, the detecting whether the captured environmental image includes a preset mark which includes the following steps.

Step 1: Extract image texture characteristics of the captured environmental image.

The extracting image texture characteristics is prior art, and is not further described herein.

Step 2: Perform matching between image texture characteristics of the preset mark and the extracted image texture characteristics, and if the matching succeeds, detect that the preset mark is included, or else, detect that the preset mark is not included.

The preset mark may include a steering wheel.

In other embodiments of the present disclosure, the preset mark may further include at least one of a dashboard and an A-pillar of the vehicle.

Using the steering wheel as an example, x image texture characteristics may be extracted from a steering wheel image, matching is performed between the image texture characteristics of the captured environmental image and the image texture characteristics of the steering wheel image, and if N image texture characteristics (where the N is less than or equal to x) are matched, it is determined that the matching succeeds, or else, it is determined that the matching fails.

Matching of the dashboard and the A-pillar of the vehicle is similar, and is not further described herein.

Alternatively, in other embodiments of the present disclosure, step S4 in all the foregoing embodiments of the present disclosure may include calculating a similarity between the captured environmental image and a standard environmental image, and when the similarity is greater than (or greater than or equal to) a similarity threshold, determining that the seat taken by the wearer is the driver's seat, or else, determining that the seat taken by the wearer is not the driver's seat.

In similarity calculation, a grey similarity between two images may be calculated, or a similarity of image texture characteristics may be calculated. For example, assuming that G image texture characteristics may be extracted from the standard environmental image, matching is performed between the image texture characteristics of the captured environmental image and the image texture characteristics of the standard environmental image, and if m image texture characteristics (where the m is less than or equal to G) are matched, it is determined that the matching succeeds, or else, it is determined that the matching fails.

In other embodiments of the present disclosure, when it is determined that the wearer is in the driving state, the control method in all the foregoing embodiments may further include, after detecting a connection to the vehicle mounted wireless network, sending device information of a wearable device that has been connected to the head mounted device, to the vehicle mounted system to which the vehicle mounted wireless network belongs.

The wearable device does not belong to the head mounted device, but is only connected to the head mounted device using WiFi, Bluetooth®, or the like. Data captured by the wearable device may be displayed using the screen display service of the head mounted device.

The wearable device may include at least one of a watch, a heart rate monitor with an armband, and a heart rate monitor with a chest strap. The device information may include at least one of a device attribute (function), pairing information (whether Bluetooth®, WiFi, and infrared are supported), and authentication information (password and device name).

After acquiring the device information, the vehicle mounted system may search for the wearable setting (for example, a heart rate monitor with a chest strap), and establish a connection with the wearable device that is searched out. After establishing the connection, the vehicle mounted system may further send status information of the wearable device with which the connection is established, to the head mounted device such that the head mounted device refreshes the status of the connected device managed by the head mounted device. The vehicle mounted system may use data of the heart rate monitor to evaluate a fatigued or tired state of the driver.

Connecting the wearable device to the vehicle mounted system can avoid that the wearer of the head mounted device views, using the near-eye display device of the head mounted device when driving the vehicle, data captured by the wearable device, and reduce power consumption of the head mounted device.

In consideration of reduction of the power consumption of the head mounted device, in other embodiments of the present disclosure, regardless of whether the wearer of the head mounted device is in the driving state, the wearable device that has established a connection with the head mounted device may be reconnected to the vehicle mounted system.

In other embodiments of the present disclosure, when it is determined that the wearer is in the driving state, the control method in all the foregoing embodiments may further include, when detecting a disconnection from the vehicle mounted wireless network, searching for a wearable device that established a connection with the head mounted device (or a wearable device that is disconnected from the head mounted device), and reestablishing a connection with the wearable device that is searched out.

That is, after the disconnection from the vehicle mounted wireless network is detected, the wearable device that established a connection with the head mounted device may be searched out actively, a connection is established with the wearable device, and data of the wearable device is received.

Correspondingly, the embodiments of the present disclosure further provide a head mounted device control apparatus.

Figure 8:
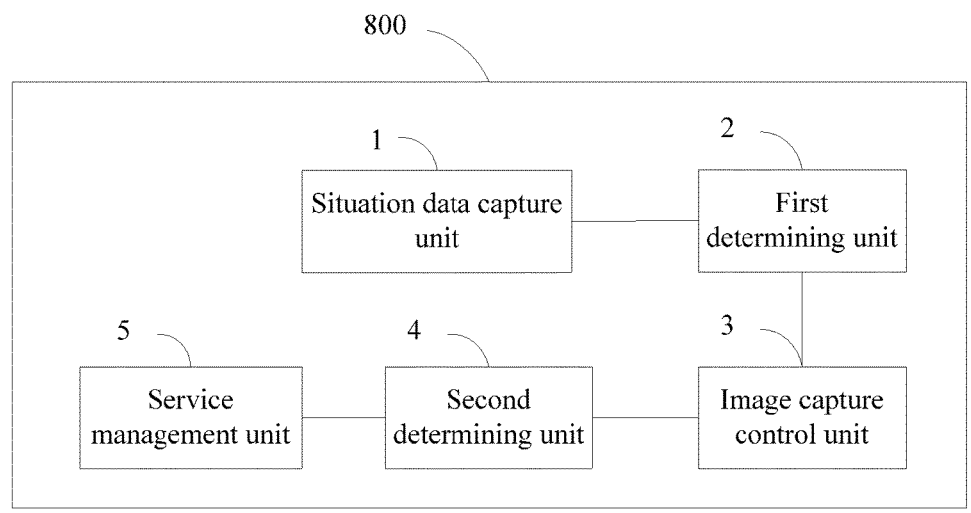
FIG. 8 is a schematic structural diagram of a head mounted device control apparatus according to an embodiment of the present disclosure.

The head mounted device control apparatus may be a logical software module installed in a head mounted device, or may be a controller independent of a head mounted device, or may be a processor of a head mounted device, or may be a chip other than a processor built in a head mounted device. Referring to FIG. 8, a head mounted device control apparatus 800 may include a situation data capture unit 1, a first determining unit 2, an image capture control unit 3, a second determining unit 4, and a service management unit 5.

The situation data capture unit 1 is configured to capture situation data.

The situation data may include at least one type of moving speed data v, signal strength data x of a vehicle mounted wireless network, user schedule data y, and environmental noise strength data z.

According to the foregoing description, it may be known that x (an actual signal strength P) may be provided by a vehicle mounted wireless network connecting module (for example, a WiFi module) in the head mounted device or by an external device (for example, a mobile phone), y may be provided by a schedule module in the head mounted device, z may be provided by a microphone in the head mounted device or by an external dedicated sound capture apparatus, and v may be captured and obtained through calculation by a GPS module or an accelerometer in the head mounted device or may be provided by a vehicle mounted system directly.

Therefore, the situation data capture unit 1 may acquire x or P from the vehicle mounted wireless network connecting module in the head mounted device or from the external device, acquire y from the schedule module in the head mounted device, acquire z from the microphone in the head mounted device or from the external dedicated sound capture apparatus, and acquire v from the GPS module/the accelerometer/the vehicle mounted system in the head mounted device. The first determining unit 2 is configured to use the situation data to determine whether a wearer of the head mounted device is inside a moving vehicle. The image capture control unit 3 is configured to control, when it is determined that the wearer is inside a moving vehicle, an image capture apparatus in the head mounted device to capture an environmental image.

The second determining unit 4 is configured to use the captured environmental image to determine whether a seat taken by the wearer is a driver's seat.

The service management unit 5 is configured to disable a preset service when it is determined that the seat taken by the wearer is the driver's seat, where the preset service includes at least a screen display service of a near-eye display.

The service management unit 5 may be further configured to enable or retain the preset service when it is determined that the seat taken by the wearer is not the driver's seat or when it is determined that the wearer is not inside a moving vehicle.

For related content, reference may be made to the foregoing description in the specification, and no further description is provided herein.

It should be noted that, when the head mounted device control apparatus is a controller independent of the head mounted device, or is a chip other than a processor built in the head mounted device, the head mounted device control apparatus may send a control instruction to the processor in the head mounted device, instructing the processor in the head mounted device to stop providing the preset service, and thereby achieving a purpose of disabling the preset service.

However, when the head mounted device control apparatus is a logical software module installed in the head mounted device, or is a processor of the head mounted device, the preset service may be disabled directly.

In other embodiments of the present disclosure, the head mounted device control apparatus 800 may further include a first connecting unit configured to send, after a connection to the vehicle mounted wireless network is detected, device information of a wearable device that has been connected to the head mounted device, to a vehicle mounted system to which the vehicle mounted wireless network belongs such that the vehicle mounted system performs a search according to the acquired device information and establishes a connection with the wearable device that is searched out, and a second connecting unit configured to search, when a disconnection from the vehicle mounted wireless network is detected, for a wearable device that established a connection with the head mounted device, and reestablish a connection with the wearable device that is searched out.

For related content, reference may be made to the foregoing description in the specification, and no further description is provided herein.

In other embodiments of the present disclosure, the head mounted device control apparatus 800 may further include a first connecting unit and a second connecting unit, where the first connecting unit is configured to send, after a connection to the vehicle mounted wireless network is detected, device information of a wearable device that has been connected to the head mounted device, to a vehicle mounted system to which the vehicle mounted wireless network belongs such that the vehicle mounted system performs a search according to the acquired device information and establishes a connection with the wearable device that is searched out, and the second connecting unit is configured to search, when a disconnection from the vehicle mounted wireless network is detected, for a wearable device that established a connection with the head mounted device, and reestablish a connection with the wearable device that is searched out.

For related content, reference may be made to the foregoing description in the specification, and no further description is provided herein.

In other embodiments of the present disclosure, the head mounted device control apparatus 800 may further include a converting unit configured to convert, when it is determined that the seat taken is the driver's seat, information received or coming from a preset emergency contact into speech information for playing.

For related content, reference may be made to the foregoing description in the specification, and no further description is provided herein.

In other embodiments of the present disclosure, the head mounted device control apparatus 800 may further include a pushing unit configured to push, when it is determined that the seat taken is the driver's seat, the screen display service to a display screen other than the head mounted device.

For related content, reference may be made to the foregoing description in the specification, and no further description is provided herein.

Figure 9:
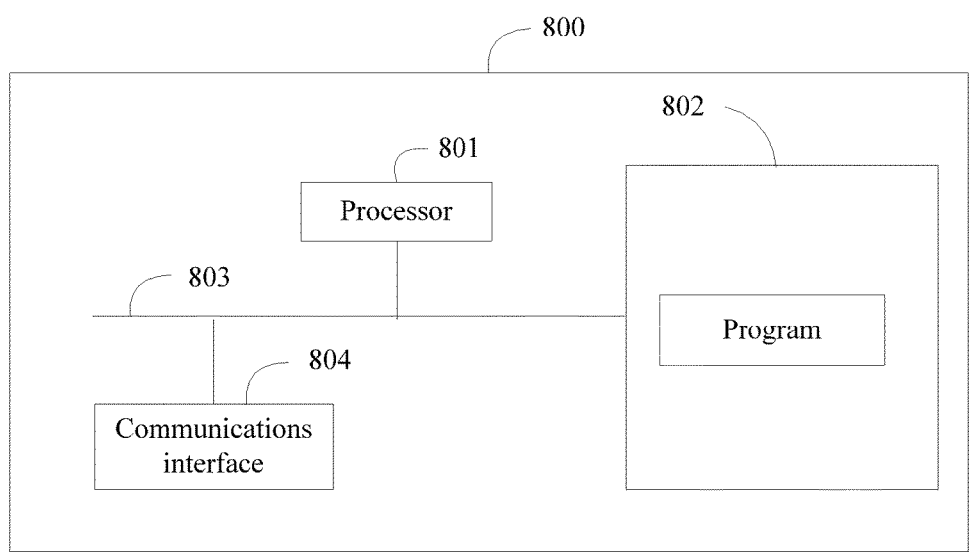
FIG. 9 is another schematic structural diagram of a head mounted device control apparatus according to an embodiment of the present disclosure.

FIG. 9 is a schematic diagram of a hardware structure of a head mounted device control apparatus 800 (used as a controller independent of a head mounted device) according to the embodiments of the present disclosure. The head mounted device control apparatus 800 may include a processor 801, a memory 802, a bus 803, and a communications interface 804. The processor 801, memory 802, and communications interface 804 are interconnected using the bus 803. The memory 802 is configured to store a program. Furthermore, the program may include program code, where the program code includes computer operation instructions.

The memory 802 may include a high-speed random access memory (RAM), and may further include a non-volatile memory, for example, at least one disk storage.

The processor 801 may be a general-purpose processor, including a CPU, a network processor (NP), and the like, or may further be a digital signal processor (DSP), an application-specific integrated circuit (ASIC), a field programmable gate array (FPGA) or another programmable logic device, a discrete gate or transistor logic device, or a discrete hardware component.

The processor 801 executes the program stored in the memory 802, for implementing the head mounted device control method provided by the embodiments of the present disclosure, including capturing situation data, where the situation data includes at least one type of moving speed data, signal strength data of a vehicle mounted wireless network, user schedule data, and environmental noise strength data, using the situation data to determine whether a wearer is inside a moving vehicle. If it is determined that the wearer is inside a moving vehicle, controlling an image capture apparatus in the head mounted device to capture an environmental image, using the captured environmental image to determine whether a seat taken by the wearer is a driver's seat, and if it is determined that the seat taken by the wearer is the driver's seat, disabling a preset service, where the preset service includes a screen display service of a near-eye display.

In addition, the processor 801 may also be configured to implement other steps in the head mounted device control method introduced in the method part in the specification and details of each step, and no further description is provided herein.

The CPU and the memory may be integrated in a same chip, or may be two independent devices.

Correspondingly, the embodiments of the present disclosure further provide a head mounted device. The head mounted device may include an image capture apparatus, a near-eye display, and the foregoing head mounted device control apparatus. The head mounted device control apparatus 800 is connected to the image capture apparatus and the near-eye display separately.

Figure 10:
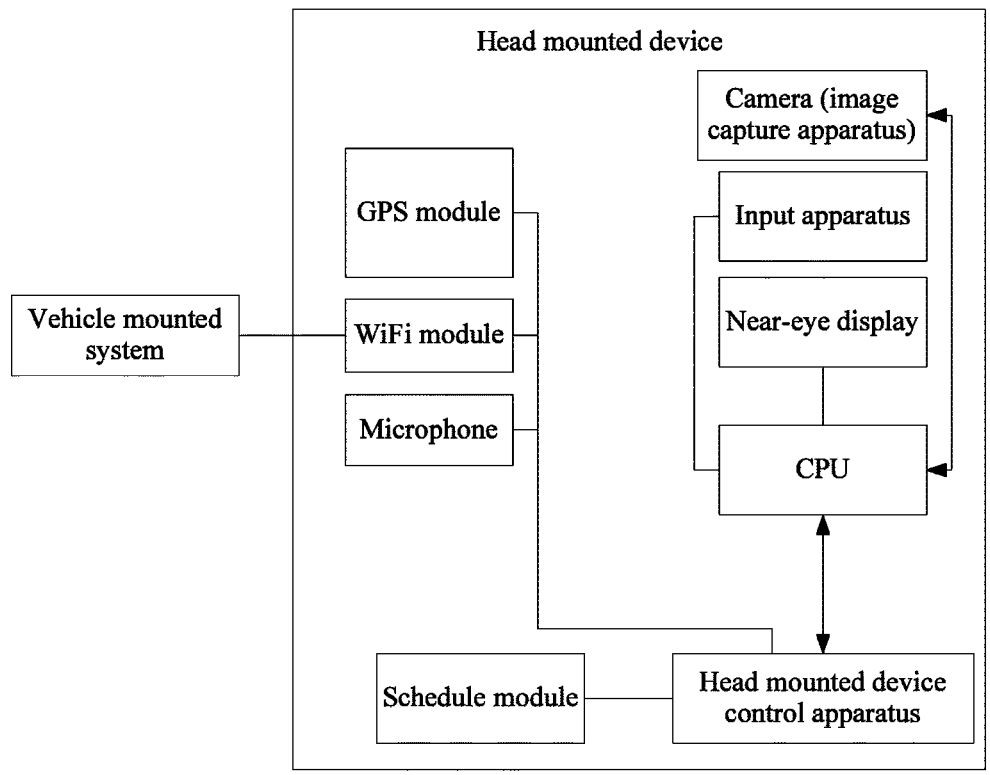
FIG. 10 is a schematic structural diagram of a head mounted device according to an embodiment of the present disclosure.

FIG. 10 shows a specific structure of the head mounted device.

It should be noted that, the prior art already provides a technical solution that restricts a driver's use of a mobile phone during driving a vehicle. In the solution, whether the driver is driving is determined by means of speed detection. If it is detected that the driver is driving, a control signal is generated using a signal generation apparatus located under the driver's seat, and the signal is transmitted to the mobile phone in the user's hand through the human body to control functions of the mobile phone such that the driver is forbidden to use the mobile phone when driving the vehicle. If it is found through speed detection that the vehicle stops, use of the mobile phone is no longer restricted, and the driver is allowed to use the mobile phone.

In the foregoing solution of the prior art, a special mobile phone having a human body communications receiving apparatus must be used, and the solution can be implemented only after the vehicle driven by the driver is reengineered to have a signal generation apparatus installed.

However, in the embodiments of the present disclosure, the head mounted device control apparatus may be a logical software module installed in the head mounted device, or may be a processor of the head mounted device, or may be a chip other than a processor built in the head mounted device. Further, the situation data capture unit 1 of the head mounted device control apparatus may acquire x or P from the vehicle mounted wireless network connecting module in the head mounted device, acquire y from the schedule module in the head mounted device, acquire z from the microphone in the head mounted device, and acquire v from the GPS module or the accelerometer in the head mounted device.

That is, from a perspective of the head mounted device, the head mounted device may determine, by analyzing data captured by the head mounted device, whether the user is driving. If it is determined that the user is driving, the preset service is disabled automatically. In this process, human body communication is not needed, and it is also unnecessary to use a device under a seat inside a vehicle to send a control instruction. Therefore, with the head mounted device, it is unnecessary to use a human body communications receiving apparatus, and unnecessary to reengineer the vehicle.

Figure 11:
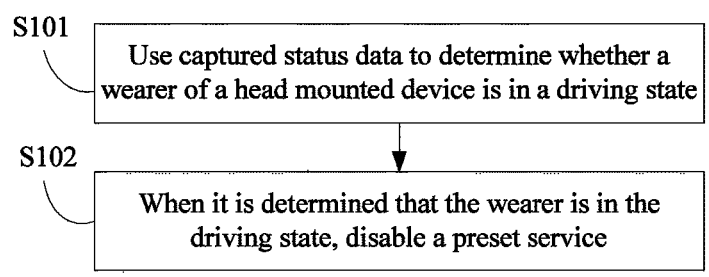
FIG. 11 is still another flowchart of a head mounted device control method according to an embodiment of the present disclosure.

Refer to FIG. 11, which is a flowchart of a head mounted device control method according to the present disclosure. The method may include at least the following steps.

Step S101: Use captured status data to determine a status of a wearer of a head mounted device.

The status data includes situation data and an environmental image. The situation data may include at least one type of moving speed data v, signal strength data x of a vehicle mounted wireless network, user schedule data y, and environmental noise strength data z.

The status includes a driving state and a non-driving state.

Step S102: When it is determined that the wearer is in the driving state, disable a preset service.

The preset service includes at least one of a screen display service of a near-eye display, a manual input service, and a projection and display service.

Generally, the head mounted device is provided with a touchpad and a button. The wearer may interact with the head mounted device by touching the touchpad or by pressing or toggling the button. However, touching, pressing, toggling, and the like may also divert attention of the wearer. Therefore, the manual input service may include manual inputs using the touchpad and the button.

In the embodiments, when it is determined using the status data, that the wearer is in the driving state, the preset service is disabled, to reduce diversion of attention of the wearer, and improve driving safety.

In other embodiments of the present disclosure, when it is determined that the wearer is in the driving state, the control method in all the foregoing embodiments may further include converting information received or coming from a preset emergency contact into speech information for playing.

An emergency contact list may be maintained in the head mounted device, where all contacts in the list are preset emergency contacts.

Further, the foregoing information may include at least one of an e-mail subject and an SMS message. When the e-mail or SMS message coming from the preset emergency contact is received, the e-mail subject or SMS message may be converted into a speech for playing to the wearer.

In other embodiments of the present disclosure, when it is determined that the wearer is in the driving state, the control method in all the foregoing embodiments may further include pushing the screen display service to a display screen other than the head mounted device. For example, the screen display service may be pushed to a display screen of a vehicle mounted system or a terminal of a passenger in the same vehicle for playing.

Figure 12:
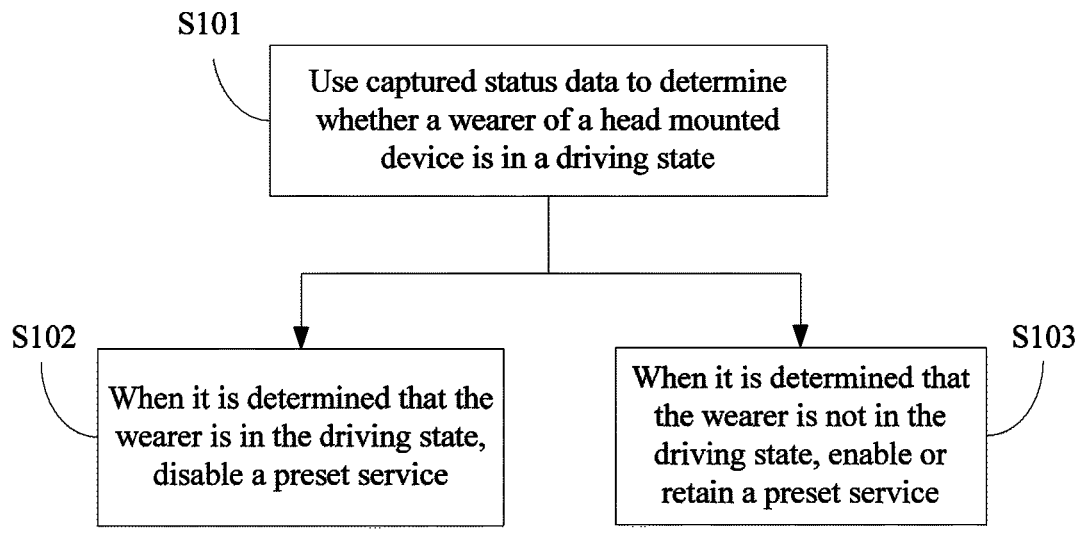
FIG. 12 is still another flowchart of a head mounted device control method according to an embodiment of the present disclosure.

In other embodiments of the present disclosure, referring to FIG. 12, the foregoing control method may further include the following step.

Step S103: When it is determined that the wearer is not in the driving state, enable or retain the preset service.

Figure 13:
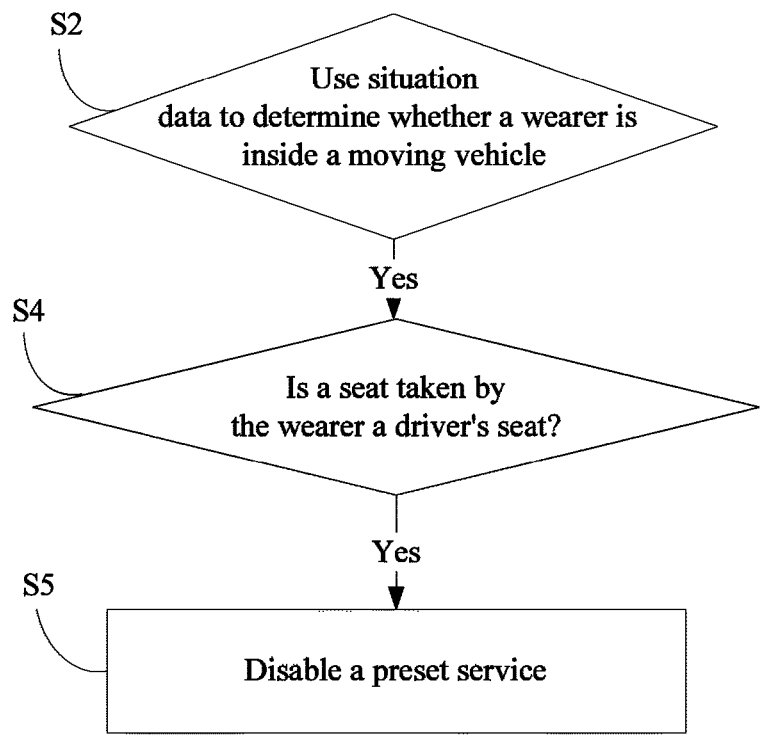
FIG. 13 is still another flowchart of a head mounted device control method according to an embodiment of the present disclosure.

In other embodiments of the present disclosure, referring to FIG. 13, the foregoing step S101 (using captured status data to determine a status of a wearer of a head mounted device) may further include the following steps.

Step S2: Use the situation data to determine whether the wearer of the head mounted device is inside a moving vehicle.

Step S4: If it is determined that the wearer is inside a moving vehicle, use the environmental image to determine whether a seat taken by the wearer is a driver's seat.

It should be noted that, in the embodiments, when the wearer is inside a moving vehicle and the seat taken is the driver's seat, it is determined that the wearer of the head mounted device is in the driving state. In other words, the driving state includes that the wearer is inside a moving vehicle and that the seat taken is the driver's seat.

That is, step 102 may further include the following step.

Step S5: If it is determined that the seat taken is the driver's seat, disable the preset service.

In other embodiments of the present disclosure, the foregoing step S101 (using captured status data to determine a status of a wearer of a head mounted device) may further include, when it is determined that the wearer is not inside a moving vehicle or that the seat taken is not the driver's seat, determining that the wearer is in the non-driving state.

In other words, the non-driving state includes that the wearer is not inside a moving vehicle or that the seat taken is not the driver's seat.

Figure 14:
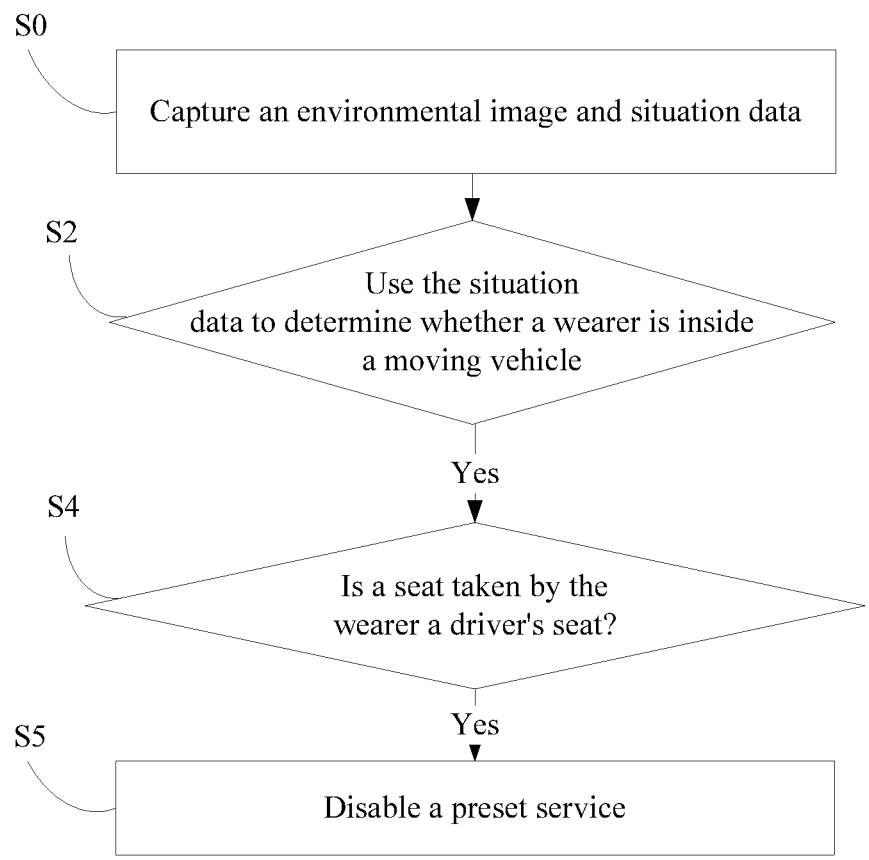
FIG. 14 is still another flowchart of a head mounted device control method according to an embodiment of the present disclosure.

In other embodiments of the present disclosure, an environmental image and situation data may be captured first (S0). Then step S101 or step S2 (referring to FIG. 14) is executed. Further, an environmental image may be captured first, and then situation data is captured, and then step S101 or step S2 is executed. Conversely, situation data may be captured first, and then an environmental image is captured, and then step S101 or step S2 is executed.

Figure 15:
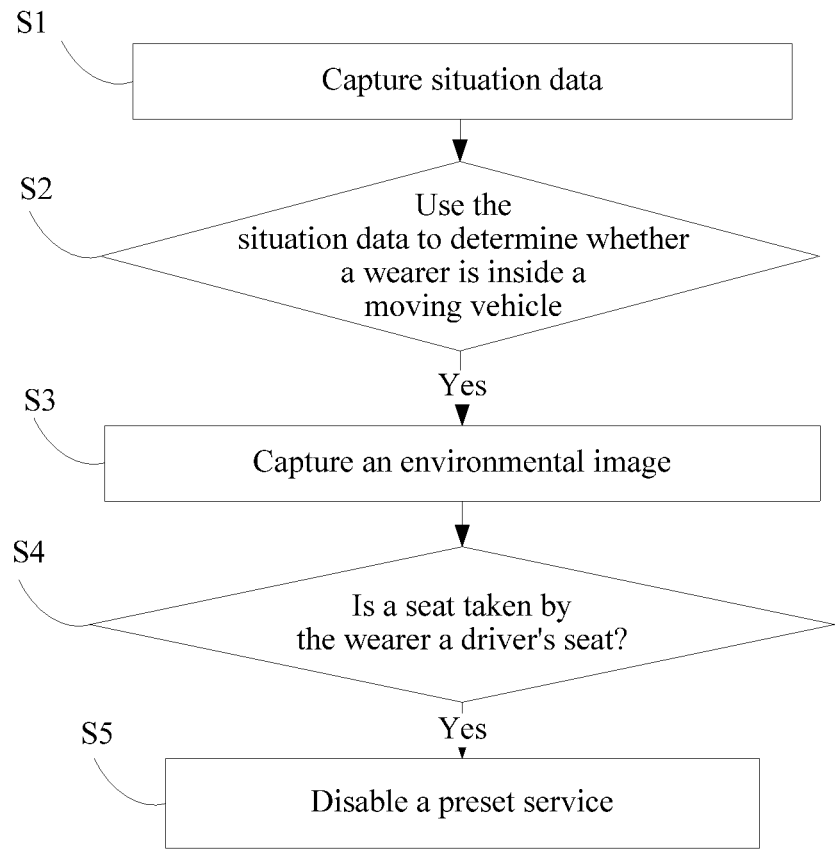
FIG. 15 is still another flowchart of a head mounted device control method according to an embodiment of the present disclosure.

Alternatively, referring to FIG. 15, situation data may be captured first (S1), and when it is determined that the wearer is inside a moving vehicle, an environmental image is captured (S3).

Figure 16:
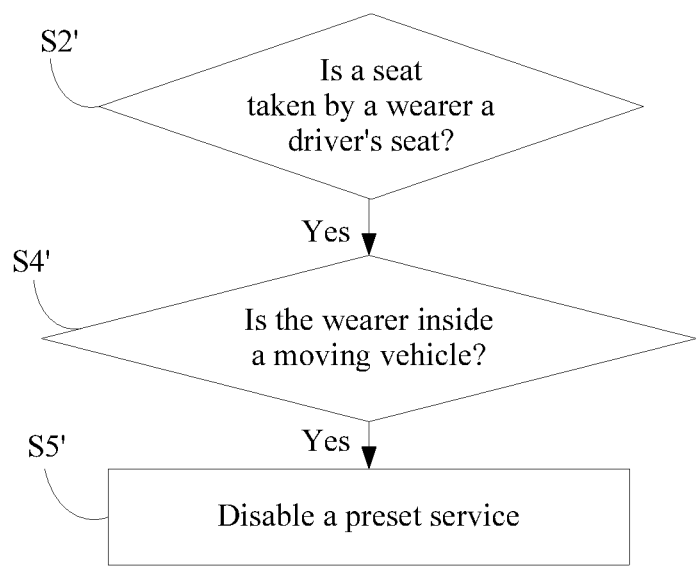
FIG. 16 is still another flowchart of a head mounted device control method according to an embodiment of the present disclosure.

In other embodiments of the present disclosure, referring to FIG. 16, the foregoing step S101 may further include the following steps.

Step S2': Use the captured environmental image to determine whether the seat taken by the wearer is the driver's seat.

Step S4': If it is determined that the seat taken by the wearer is the driver's seat, use the situation data to determine whether the wearer of the head mounted device is inside a moving vehicle.

When the wearer is inside a moving vehicle and the seat taken is the driver's seat, it is determined that the wearer of the head mounted device is in the driving state.

That is, step 102 may further include the following step.

Step S5': If it is determined that the seat taken is the driver's seat, disable the preset service.

In other embodiments of the present disclosure, the foregoing step S101 (using captured status data to determine a status of a wearer of a head mounted device) may further include, when it is determined that the seat taken is not the driver's seat or that the wearer is not inside a moving vehicle, determining that the wearer is in the non-driving state.

Figure 17:
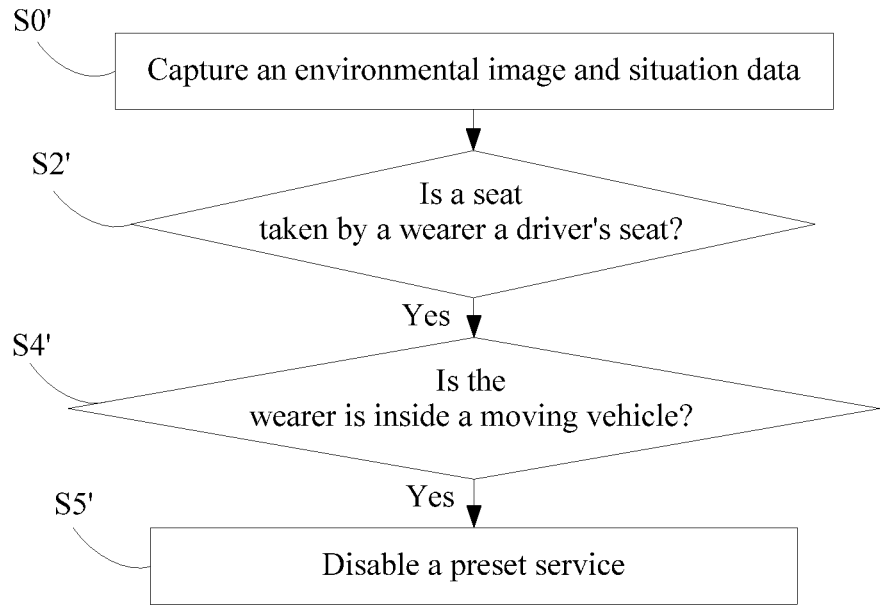
FIG. 17 is still another flowchart of a head mounted device control method according to an embodiment of the present disclosure.

In other embodiments of the present disclosure, an environmental image and situation data may be captured first (S0'). Then step S101 or step S2' (referring to FIG. 17) is executed.

Further, an environmental image may be captured first, and then situation data is captured, and then step S101 or step S2' is executed. Conversely, situation data may be captured first, and then an environmental image is captured, and then step S101 or step S2' is executed.

Figure 18:
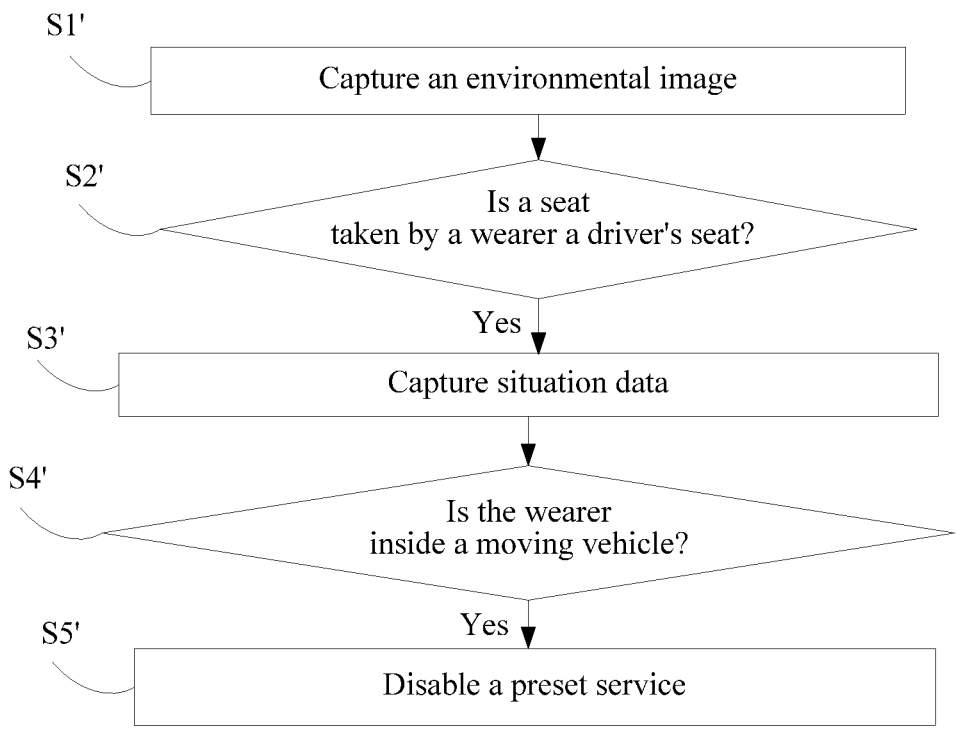
FIG. 18 is still another flowchart of a head mounted device control method according to an embodiment of the present disclosure.

Alternatively, referring to FIG. 18, an environmental image may be captured first (S1'), and when it is determined that the seat taken by the wearer is the driver's seat, situation data is captured (S3').

In the embodiments, an environmental image may be captured periodically.

Corresponding to the technical solutions provided in FIG. 13 to FIG. 18, step S103 may further include the following step. Step S6: If it is determined that the seat taken is not the driver's seat, or if it is determined that the wearer is not inside a moving vehicle, enable or retain the preset service.

Figure 19:
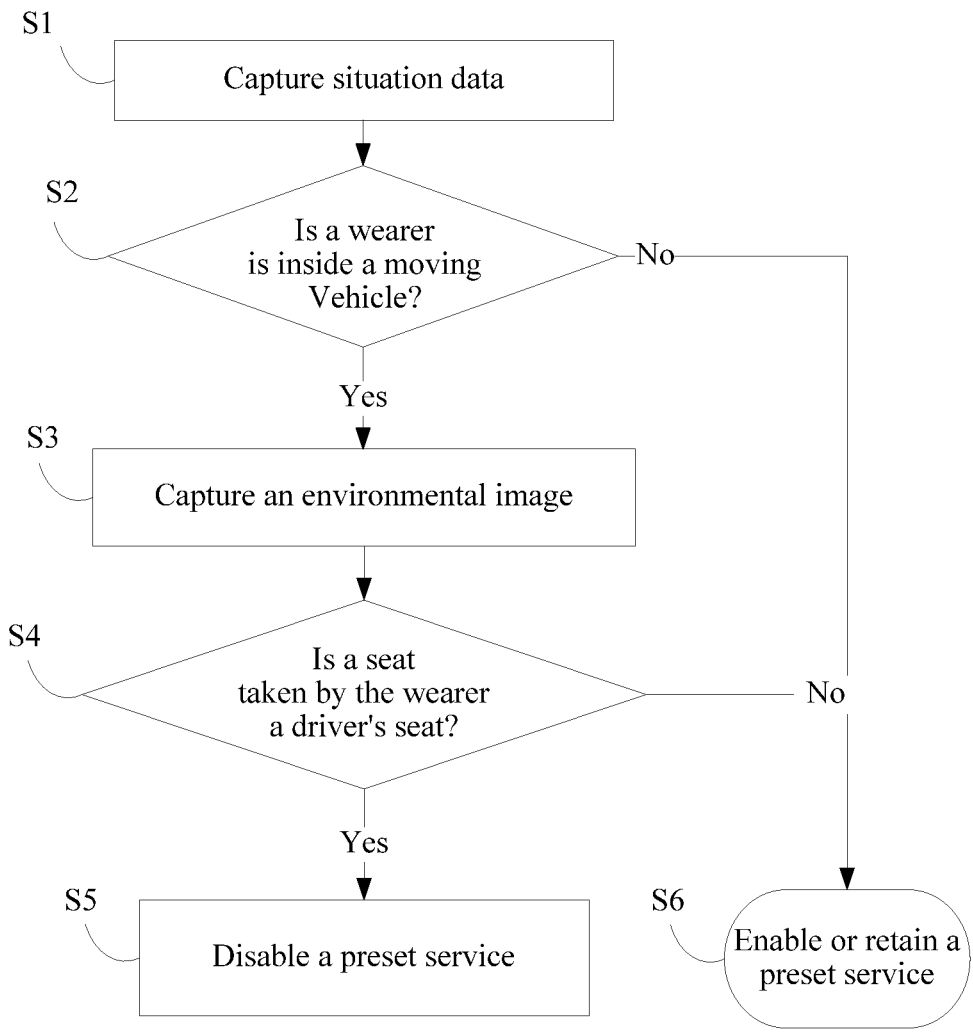
FIG. 19 is still another flowchart of a head mounted device control method according to an embodiment of the present disclosure.

In particular, referring to FIG. 19, if it is determined that the wearer is not inside a moving vehicle when step S2 is executed, it is unnecessary to execute a corresponding action of capturing an environmental image in step S3. Instead, whether the user is in the non-driving state may be determined directly, and step S6 is executed to enable or retain the preset service.

Figure 20:
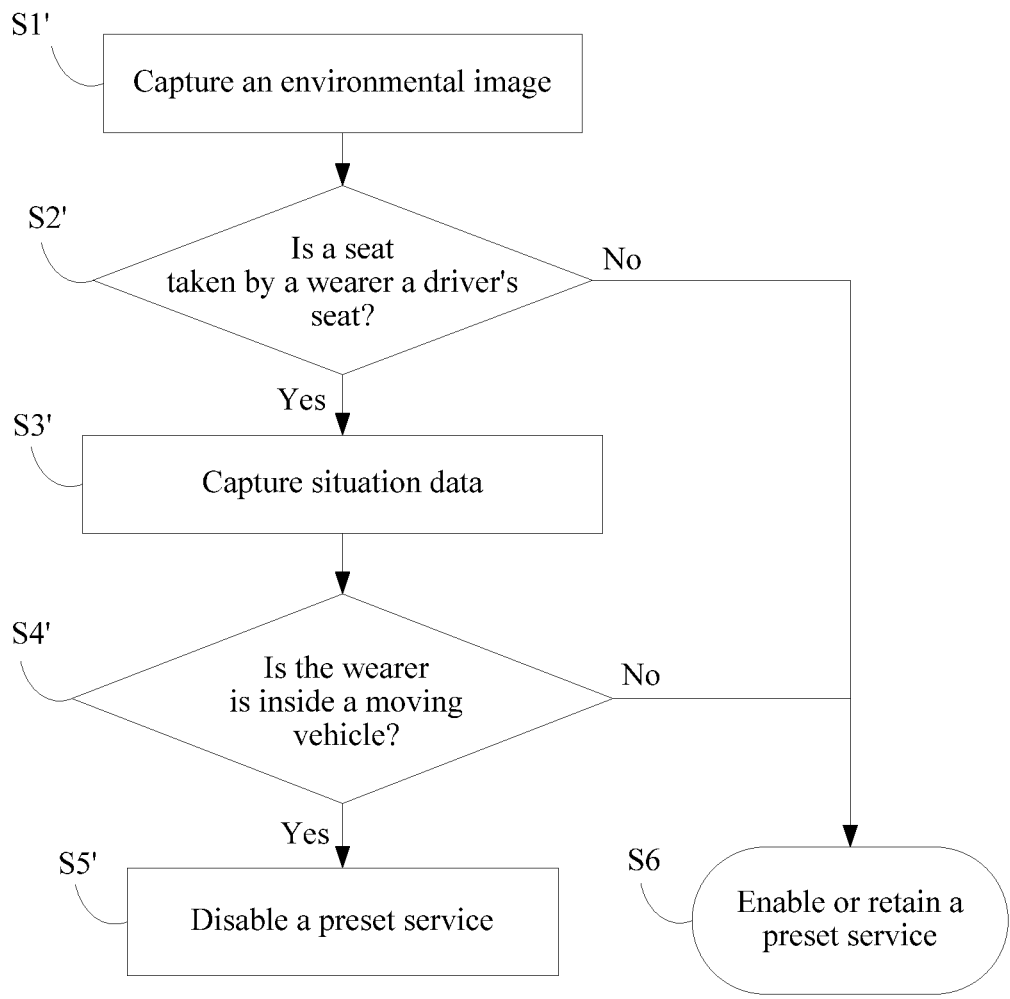
FIG. 20 is still another flowchart of a head mounted device control method according to an embodiment of the present disclosure.

Alternatively, referring to FIG. 20, if it is determined that the wearer is not in the driver's seat when step S2' is executed, it is unnecessary to execute a corresponding action of capturing situation data in step S3'. Instead, whether the user is in the non-driving state may be determined directly, and step S6 is executed to enable or retain the preset service.

In other embodiments of the present disclosure, the using the situation data to determine whether the wearer of the head mounted device is inside a moving vehicle and the using the captured environmental image to determine whether the seat taken by the wearer is the driver's seat are not subject to any time sequence, and may be executed in parallel.

When the wearer is inside a moving vehicle and the seat taken is the driver's seat, it is determined that the wearer of the head mounted device is in the driving state. When the wearer is not inside a moving vehicle or the seat taken is not the driver's seat, it is determined that the wearer of the head mounted device is not in the driving state.

In conclusion, in the foregoing multiple embodiments, the sequence of capturing an environmental image and capturing situation data is not fixed. An environmental image and situation data may be captured first, and then determining is performed, or a first type of data (data environmental image or situation data) may be captured first, and after the first type of data is used to perform first determining (determining whether a wearer of a head mounted device is inside a moving vehicle or determining whether a seat taken by a wearer is a driver's seat), a second type of data (situation data or data environmental image) is captured, and then the second type of data is used to perform second determining (determining whether the seat taken by the wearer is the driver's seat or determining whether the wearer of the head mounted device is inside a moving vehicle), or after a first type of data is used to perform first determining, a second type of data may not be captured if second determining does not need to be performed.

The following introduces in detail how the situation data is used to determine whether the wearer is inside a moving vehicle.

In other embodiments of the present disclosure, the method in all the foregoing embodiments may further include the following step, obtaining a situation evaluation value through calculation according to the situation data (S7).

Whether the wearer is inside a moving vehicle may be determined according to the situation evaluation value. For example, whether the wearer is inside a moving vehicle may be determined according to whether the situation evaluation value is greater than or equal to a threshold.

The "use the situation data to determine whether the wearer is inside a moving vehicle" may further include determining whether the situation evaluation value is greater than or equal to a threshold, and if the situation evaluation value is greater than or equal to the threshold, determining that the wearer is inside a moving vehicle, or if the situation evaluation value is less than the threshold, determining that the wearer is not inside a moving vehicle.

Figure 21:
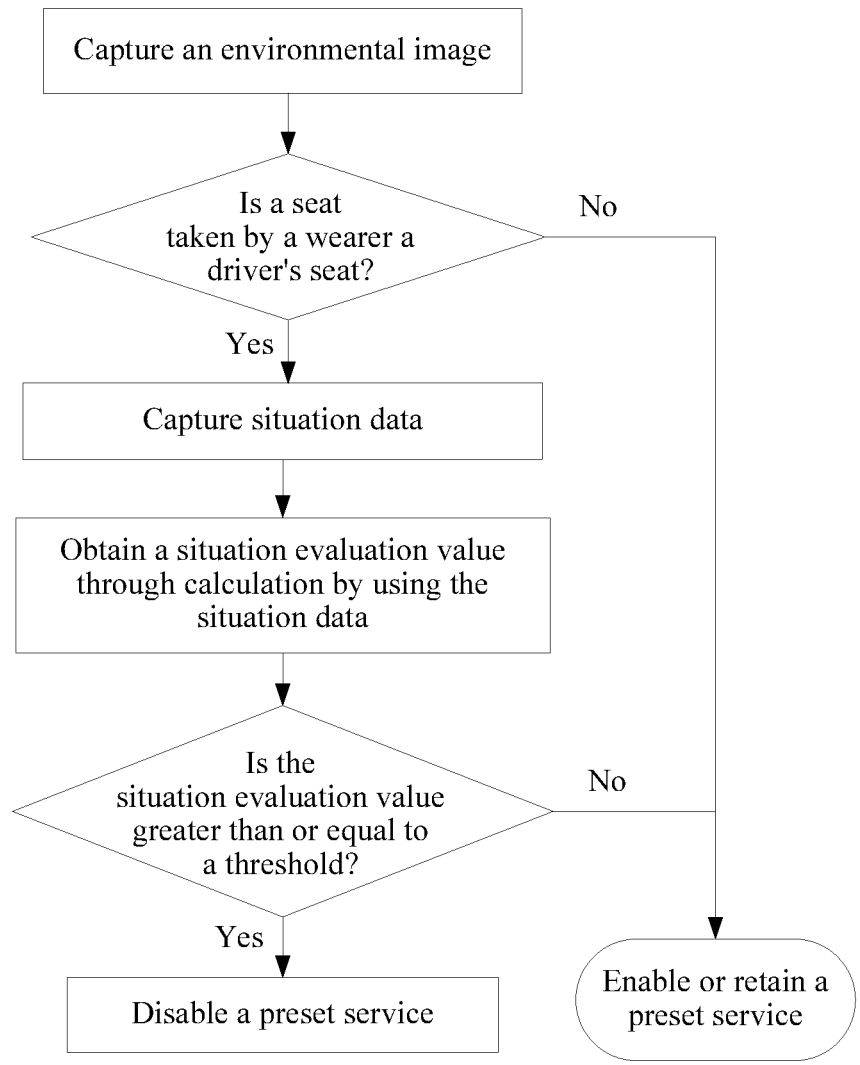
FIG. 21 is still another flowchart of a head mounted device control method according to an embodiment of the present disclosure.
Figure 22:
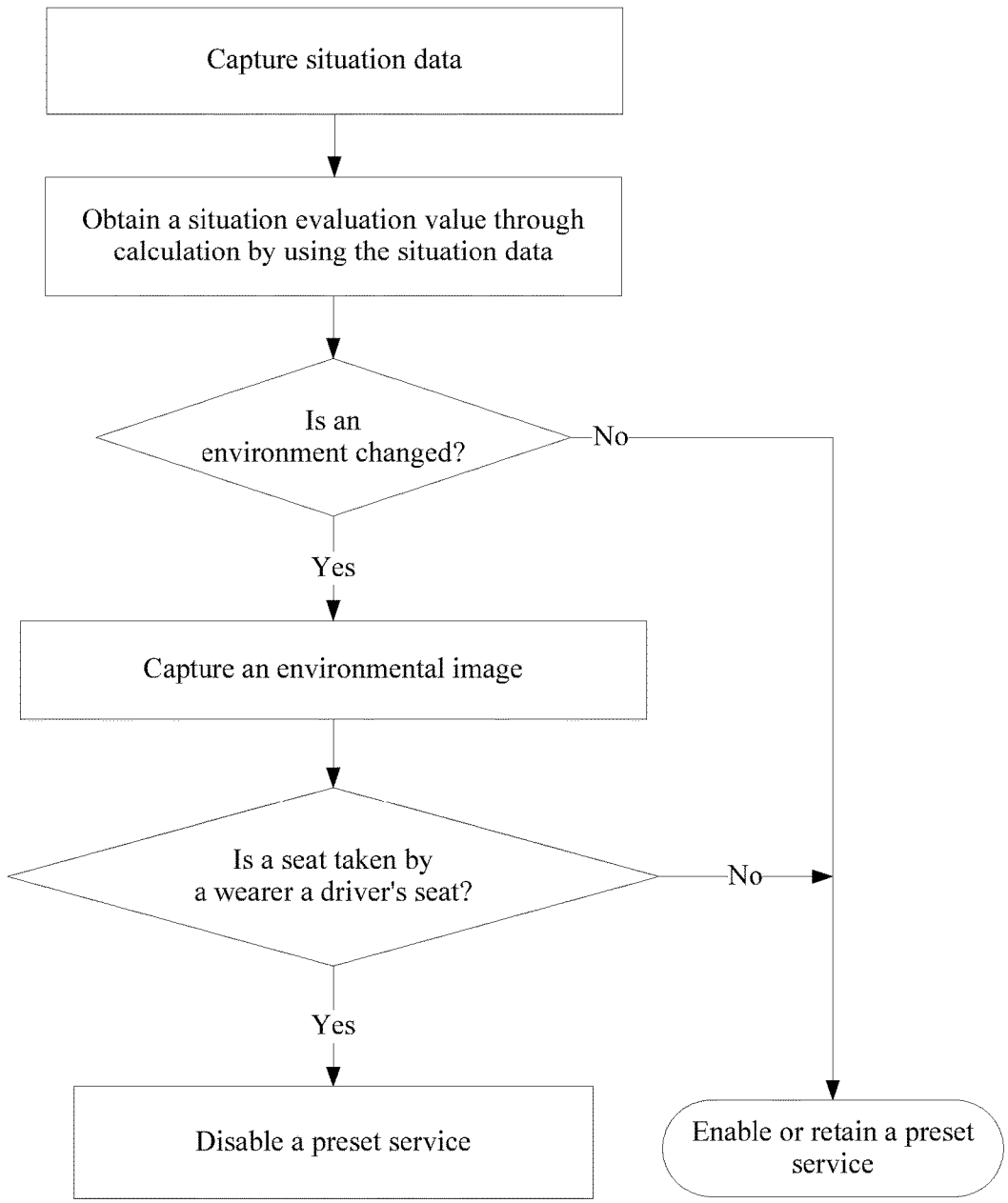
FIG. 22 is still another flowchart of a head mounted device control method according to an embodiment of the present disclosure.

Because multiple processes are introduced above, the process provided in FIG. 19 or 20 is used as an example. For a process based on a situation evaluation value, reference may be made to FIG. 21 or 22.

For the threshold, an initial value of the threshold may be set to "2" or "3". In addition, with respect to different thresholds, user feedbacks may be received, correction of determining performed using the thresholds is checked, and finally, an optimum threshold is selected.

In other embodiments of the present disclosure, the method in all the foregoing embodiments may further include the following step, when a restart condition is satisfied, restarting the image capture apparatus in the head mounted device to capture an environmental image and perform a subsequent determining operation.

The restart condition may include at least one of the following: A situation that the wearer is in changes, for example, the situation changes from being inside a moving vehicle to not being inside a moving vehicle (for example, the wearer leaves a vehicle, or the vehicle changes from moving to moving stopped), and the situation changes from not being inside a moving vehicle to being inside a moving vehicle (for example, the wearer enters a vehicle, or the vehicle changes from moving stopped to moving).

More further, a comparison may be made between a situation evaluation value (F1) obtained through calculation at a current time and a situation evaluation value (F0) obtained through calculation at a previous time to determine whether the restart condition is satisfied. When F0 is less than the threshold but F1 is greater than or equal to the threshold, or when F0 is greater than or equal to the threshold but F1 is less than or equal to the threshold, it is determined that the situation that the wearer is in changes.

Figure 23:
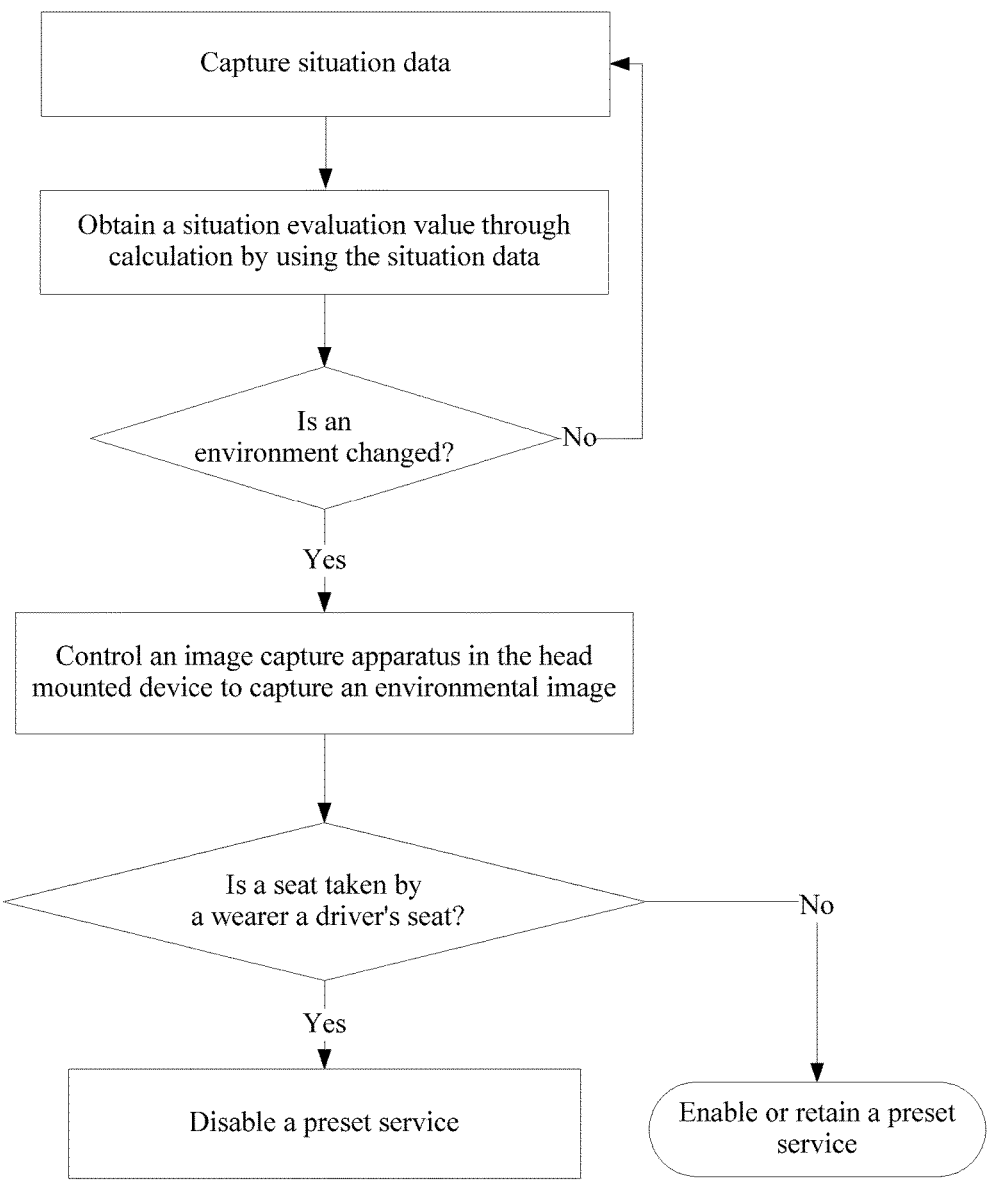
FIG. 23 is still another flowchart of a head mounted device control method according to an embodiment of the present disclosure.
Figure 24:
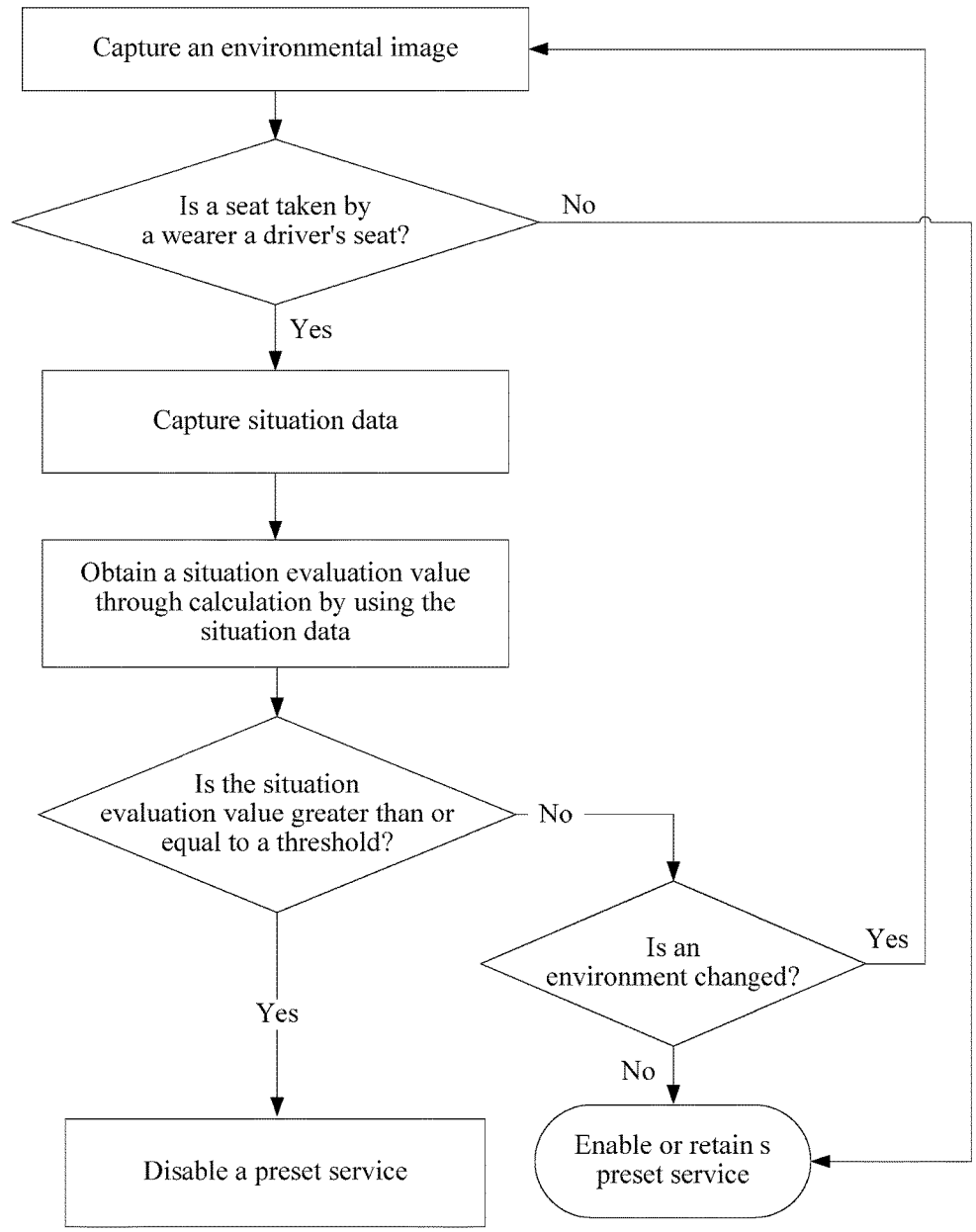
FIG. 24 is still another flowchart of a head mounted device control method according to an embodiment of the present disclosure.

Based on whether the situation that the wearer is in changes, the operation of capturing an environmental image is restarted. The process of the foregoing control method may further have many variations, for example, those shown in FIG. 23 and FIG. 24.

In other embodiments of the present disclosure, the foregoing step S7 may further include substituting the situation data into a situation evaluation function to obtain a situation evaluation value.

More further, the situation evaluation function may include at least one of a signal strength evaluation function $f_1(x)$, a schedule evaluation function $f_2(y)$, an environmental noise evaluation function $f_3(z)$, and a moving speed evaluation function $f_4(v)$, where x indicates the signal strength data, the y indicates the user schedule data, z indicates an environmental noise strength evaluation value, and v indicates the moving speed data.

The situation evaluation function may be denoted by F(x,y,z,v).

In other embodiments of the present disclosure, the "substitute the situation data into a situation evaluation function to obtain a situation evaluation value" may include at least one of the following: substituting x into $f_1(x)$ to obtain a signal strength evaluation value, substituting y into $f_2(y)$ to obtain a schedule evaluation value, substituting z into $f_3(z)$ to obtain an environmental noise strength evaluation value, and substituting v into $f_4(v)$ to obtain a moving speed evaluation value.

More further, F(x, y, z, v)=$f_1(x)+f_2(y)+f_3(z)+f_4(v)$. In this case, the situation evaluation value is equal to a sum of the signal strength evaluation value, the schedule evaluation value, the schedule evaluation value, and the moving speed evaluation value.

The following introduces each function in detail.

I. Signal Strength Evaluation Function $f_1(x)$ may have multiple expressions, for example, $f_1(x) = \alpha_1 x$, where $\alpha_1$ indicates a signal strength weight, $\alpha_1 > 0$, and x indicates a detected signal strength of the vehicle mounted wireless network (WiFi or other wireless communications networks).

x may be captured by a vehicle mounted wireless network connecting module (for example, a WiFi module) in the head mounted device or by an external device (for example, a mobile phone). A greater x value indicates that the head mounted device is more possibly inside a vehicle.

More further, x=90+P, where P indicates an actual signal strength, a value range of P is [−90 dBm, 0 dBm], and $\alpha_1 = 1/90$.

x=90+P, and a value of $\alpha_1$ is obtained according to the following assumption.

It is assumed that a weakest signal strength that can be detected far away from a vehicle is −90 dBm, while a signal strength of the user inside a vehicle is 0 dBm, that is, an actual range of signal strengths that can be detected is (−90 dBm, 0 dBm). Then, after normalization processing, assuming x=90+P and $\alpha_1 = 1/90$, a value range of $f_1(x)$ is [0, 1].

Certainly, x=90+P and $\alpha_1 = 1/90$ are only one of examples provided in the embodiments. A person skilled in the art may perform a flexible setting according to an actual situation, for example, assume $\alpha_1 = 1/180$, and assume x=180+P.

For detailed content, reference may be made to the foregoing description in the specification, and no further description is provided herein.

II. Schedule Evaluation Function $f_2(y)$ may have multiple expressions, for example, $$f_2(y) = \begin{cases} 0, & y \cap \Omega = \emptyset \\ \alpha_2, & y \cap \Omega \neq \emptyset \end{cases},$$

where, $\alpha_2$ indicates a schedule weight and $\alpha_2 > 0$, y includes a schedule event set at a data capture time, and $\Omega$ indicates a preset specific event set.

y may be captured and provided by a schedule module in the head mounted device.

For detailed content, reference may be made to the foregoing description in the specification, and no further description is provided herein.

III. Environmental Noise Evaluation Function $f_3(z)$ may have multiple expressions, for example, $$f_3(z) = \alpha_3 z,$$

where, $\alpha_3$ indicates an environmental noise strength weight, $\alpha_3 > 0$, and z indicates an environmental noise strength.

An environmental noise may be captured by a microphone in the head mounted device or by an external dedicated sound capture apparatus.

For detailed content, reference may be made to the foregoing description in the specification, and no further description is provided herein.

IV. Moving Speed Evaluation $f_4(v)$ may have multiple expressions, for example, $$f_4(v) = \begin{cases} \beta_1 v + t_1, & v < v_0 \\ \beta_2 v + t_2, & v \geq v_0 \end{cases},$$

where $v_0$ indicates a speed threshold, $\beta_1$ indicates a first moving speed weight, $\beta_2$ indicates a second moving speed weight, $t_1$ indicates a first speed minimum impact value, $t_2$ indicates a second speed minimum impact value, $\beta_2 \geq \beta_1 > 0$, and $t_2 \geq t_1 > 0$.

v may be captured and calculated by a GPS module or an accelerometer in the head mounted device, or may be provided by the vehicle mounted system directly.

$v_0$ is a speed threshold. If this threshold is exceeded, a higher speed indicates that the user is more possibly inside a moving vehicle.

Furthermore, $v_0 = 30$ km/h, $\beta_1 = 1/90$, $t_1 = 0.01$, $\beta_2 = 1/60$, and $t_2 = 0.1$. Assuming that a value range of v is [0,120], a value range of $f_4(v)$ is [0.01,2.1].

Certainly, a person skilled in the art may flexibly set values of $v_0$, $\beta_1$, $\beta_2$, $t_1$, and $t_2$, which is not further described herein.

For detailed content, reference may be made to the foregoing description in the specification, and no further description is provided herein.

The following introduces how to capture an environmental image.

In other embodiments of the present disclosure, the environmental image may be captured in the following manner:

setting photographing parameters and performing photographing to obtain the environmental image, where the photographing parameters may be set according to v, or the photographing parameters are preset standard photographing parameters (that is, the photographing parameters are set to the preset standard photographing parameters).

More further, the photographing parameters may include an exposure time, a reciprocal F of a ratio of an aperture diameter to a focal length of a lens, a sensitivity, and a selected focus.

For how to set the photographing parameters according to the moving speed data v, reference may be made to the foregoing introduction in the specification, and no further description is provided herein.

The following introduces how it is determined whether the seat taken by the wearer is the driver's seat.

In other embodiments of the present disclosure, the "use the captured environmental image to determine whether the seat taken by the wearer is the driver's seat" in all the foregoing embodiments may include detecting whether the captured environmental image includes a preset mark, and if it is detected that the preset mark is included, determining that the seat taken by the wearer is the driver's seat, or if it is detected that the preset mark is not included, determining that the seat taken by the wearer is not the driver's seat.

For detailed content, reference may be made to the foregoing description in the specification, and no further description is provided herein.

Alternatively, in other embodiments of the present disclosure, the "using the captured environmental image to determine whether the seat taken by the wearer is the driver's seat" in all the foregoing embodiments may include calculating a similarity between the captured environmental image and a standard environmental image, and when the similarity is greater than (or greater than or equal to) a similarity threshold, determining that the seat taken by the wearer is the driver's seat, or else, determining that the seat taken by the wearer is not the driver's seat.

For detailed content, reference may be made to the foregoing description in the specification, and no further description is provided herein.

In other embodiments of the present disclosure, after it is determined that the wearer is in the driving state, the control method in all the foregoing embodiments may further include, after detecting a connection to the vehicle mounted wireless network, sending device information of a wearable device that has been connected to the head mounted device, to the vehicle mounted system to which the vehicle mounted wireless network belongs.

After acquiring the device information, the vehicle mounted system may search for the wearable device, and establish a connection with the wearable device that is searched out.

In addition, after establishing the connection, the vehicle mounted system may further send status information of the wearable device with which the connection is established, to the head mounted device such that the head mounted device refreshes the status of the connected device managed by the head mounted device. The vehicle mounted system may use data of the heart rate monitor to evaluate a fatigued or tired state of the driver.

Connecting the wearable device to the vehicle mounted system can avoid that the wearer of the head mounted device views, using the near-eye display device of the head mounted device when driving the vehicle, data captured by the wearable device, and reduce power consumption of the head mounted device.

In consideration of reduction of the power consumption of the head mounted device, in other embodiments of the present disclosure, regardless of whether the wearer of the head mounted device is in the driving state, the wearable device that has established a connection with the head mounted device may be reconnected to the vehicle mounted system.

For detailed content, reference may be made to the foregoing description in the specification, and no further description is provided herein.

In other embodiments of the present disclosure, when it is determined that the wearer is in the driving state, the control method in all the foregoing embodiments may further include, when detecting a disconnection from the vehicle mounted wireless network, searching for a wearable device that established a connection with the head mounted device (or a wearable device that is disconnected from the head mounted device), and reestablishing a connection with the wearable device that is searched out.

Certainly, when it is determined that the wearer is in the non-driving state, a search for a wearable device that established a connection with the head mounted device may be performed, and a connection is reestablished with the wearable device that is searched out.

Correspondingly, the embodiments of the present disclosure further provide a head mounted device control apparatus.

The head mounted device control apparatus may be a logical software module installed in a head mounted device, or may be a controller independent of a head mounted device, or may be a processor of a head mounted device, or may be a chip other than a processor built in a head mounted device.

Figure 25:
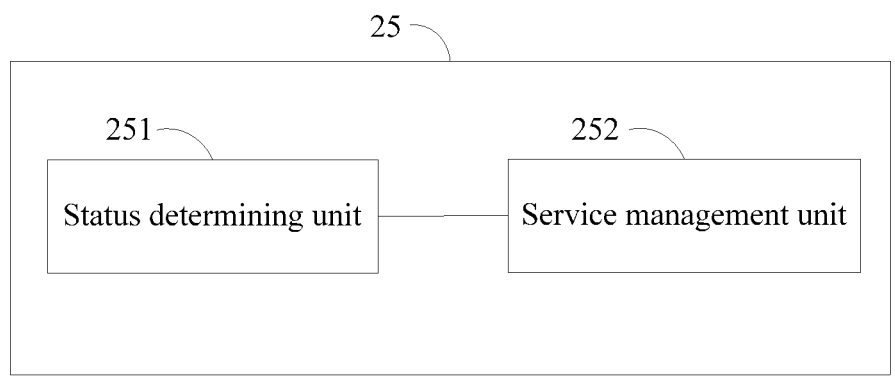
FIG. 25 is still another schematic structural diagram of a head mounted device control apparatus according to an embodiment of the present disclosure.

Referring to FIG. 25, a head mounted device control apparatus 25 may include the following.

A status determining unit 251 is configured to use captured status data to determine a status of a wearer of a head mounted device.

The status includes a driving state and a non-driving state. The status data includes situation data and an environmental image. The situation data may include at least one type of moving speed data, signal strength data of a vehicle mounted wireless network, user schedule data, and environmental noise strength data.

For detailed content, reference may be made to the foregoing description in the specification, and no further description is provided herein.

A service management unit 252 is configured to disable a preset service when it is determined that the wearer is in the driving state, where the preset service includes a screen display service of a near-eye display.

The service management unit 252 may be further configured to enable or retain the preset service when it is determined that the wearer is not in the driving state.

For related content, reference may be made to the foregoing description in the specification, and no further description is provided herein.

It should be noted that, when the head mounted device control apparatus is a controller independent of the head mounted device, or is a chip other than a processor built in the head mounted device, the head mounted device control apparatus may send a control instruction to the processor in the head mounted device, instructing the processor in the head mounted device to stop providing the preset service, and thereby achieving a purpose of disabling the preset service.

However, when the head mounted device control apparatus is a logical software module installed in the head mounted device, or is a processor of the head mounted device, the preset service may be disabled directly.

In other embodiments of the present disclosure, the head mounted device control apparatus 25 may further include the following.

A first connecting unit is configured to send, when a connection to the vehicle mounted wireless network is detected, device information of a wearable device that has been connected to the head mounted device, to a vehicle mounted system to which the vehicle mounted wireless network belongs such that the vehicle mounted system performs a search according to the acquired device information and establishes a connection with the wearable device that is searched out.

Further, the first connecting unit may send, when a connection to the vehicle mounted wireless network is detected after it is determined that the wearer is in the driving state, device information of a wearable device that has been connected to the head mounted device, to the vehicle mounted system to which the vehicle mounted wireless network belongs.

A second connecting unit is configured to search, when a disconnection from the vehicle mounted wireless network is detected, for a wearable device that established a connection with the head mounted device, and reestablish a connection with the wearable device that is searched out.

Alternatively, the second connecting unit may be configured to search, when it is determined that the wearer is in the non-driving state, for a wearable device that established a connection with the head mounted device, and reestablish a connection with the wearable device that is searched out.

Alternatively, the second connecting unit may be configured to search, when a disconnection from the vehicle mounted wireless network is detected after it is determined that the wearer is in the driving state, for a wearable device that established a connection with the head mounted device, and reestablish a connection with the wearable device that is searched out.

For related content, reference may be made to the foregoing description in the specification, and no further description is provided herein.

In other embodiments of the present disclosure, the head mounted device control apparatus 25 may further include an information converting unit configured to convert, when it is determined that the wearer is in the driving state, information received or coming from a preset emergency contact into speech information for playing.

For related content, reference may be made to the foregoing description in the specification, and no further description is provided herein.

In other embodiments of the present disclosure, the head mounted device control apparatus 25 may further include a screen display service pushing unit configured to push, when it is determined that the wearer is in the driving state, the screen display service to a display screen other than the head mounted device.

For related content, reference may be made to the foregoing description in the specification, and no further description is provided herein.

Figure 26:
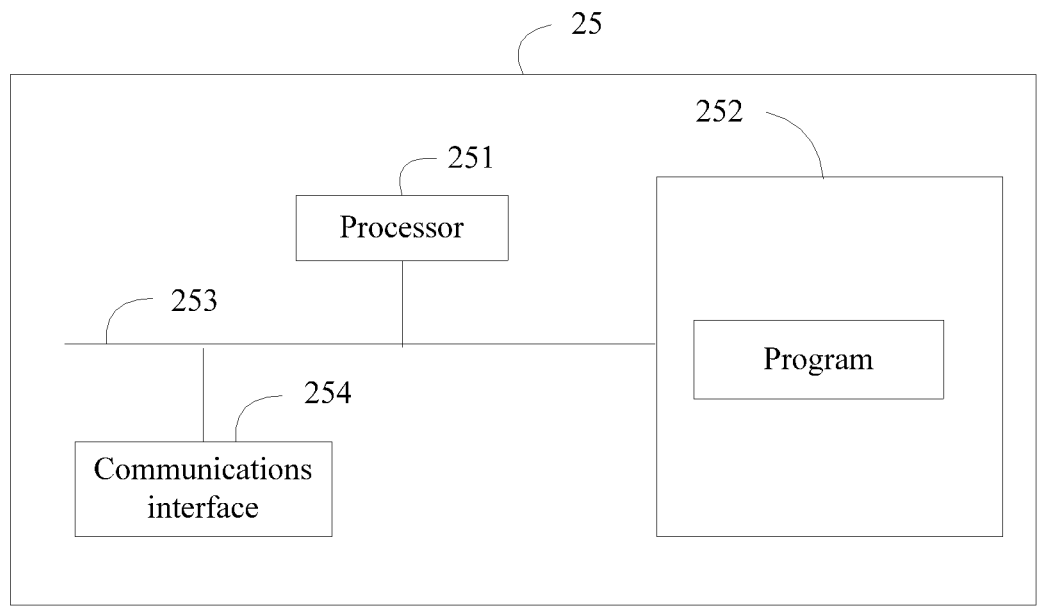
FIG. 26 is still another schematic structural diagram of a head mounted device control apparatus according to an embodiment of the present disclosure.

FIG. 26 is a schematic diagram of a hardware structure of a head mounted device control apparatus 25 (used as a controller independent of a head mounted device) according to the embodiments of the present disclosure. The head mounted device control apparatus 25 may include a processor 251, a memory 252, a bus 253, and a communications interface 254. The processor 251, memory 252, and communications interface 254 are interconnected using the bus 253. The memory 252 is configured to store a program. Further, the program may include program code, where the program code includes computer operation instructions.

The memory 252 may include a high-speed RAM, and may further include a non-volatile memory, for example, at least one disk storage.

The processor 251 may be a general-purpose processor, including a CPU, a NP, and the like, or may further be a DSP, an ASIC, a FPGA or another programmable logic device, a discrete gate or transistor logic device, or a discrete hardware component.

The processor 251 executes the program stored in the memory 252, for implementing the head mounted device control method provided by the embodiments of the present disclosure, including using captured status data to determine a status of a wearer of the head mounted device, and when it is determined that the wearer is in a driving state, disabling a preset service.

The status data includes situation data and an environmental image. The situation data may include at least one type of moving speed data v, signal strength data x of a vehicle mounted wireless network, user schedule data $y^y$, and environmental noise strength data z.

The status includes the driving state and a non-driving state.

The preset service includes at least one of a screen display service of a near-eye display, a manual input service, and a projection and display service.

For detailed content, reference may be made to the foregoing description in the specification, and no further description is provided herein.

In addition, the processor 251 may also be configured to implement other steps in the head mounted device control method introduced in the method part in the specification and details of each step, and no further description is provided herein.

For example, in other embodiments of the present disclosure, the memory 252 further stores an executable instruction, and the processor 251 may implement the following step by executing the executable instruction, when it is determined that the wearer is not in the driving state, enabling or retaining the preset service.

For another example, in other embodiments of the present disclosure, the memory 252 further stores an executable instruction, and the processor 251 may implement the following step by executing the executable instruction, when it is determined that the wearer is in the driving state, converting information received or coming from a preset emergency contact into speech information for playing.

For another example, in other embodiments of the present disclosure, the memory 252 further stores an executable instruction, and the processor 251 may implement the following step by executing the executable instruction, when it is determined that the wearer is in the driving state, pushing the screen display service to a display screen other than the head mounted device.

For another example, in other embodiments of the present disclosure, the memory 252 further stores an executable instruction, and the processor 251 may implement the following step (corresponding to using the status data to determine the status of the wearer of the head mounted device) by executing the executable instruction, using the situation data to determine whether the wearer of the head mounted device is inside a moving vehicle. If it is determined that the wearer is inside a moving vehicle, using the environmental image to determine whether a seat taken by the wearer is a driver's seat, and when the wearer is inside a moving vehicle and the seat taken is the driver's seat, determining that the wearer of the head mounted device is in the driving state.

The CPU and the memory may be integrated in a same chip, or may be two independent devices.

Correspondingly, the embodiments of the present disclosure further provide a head mounted device. The head mounted device may include an image capture apparatus, a near-eye display, and the foregoing head mounted device control apparatus. The head mounted device control apparatus 25 is connected to the image capture apparatus and the near-eye display separately.

Figure 27:
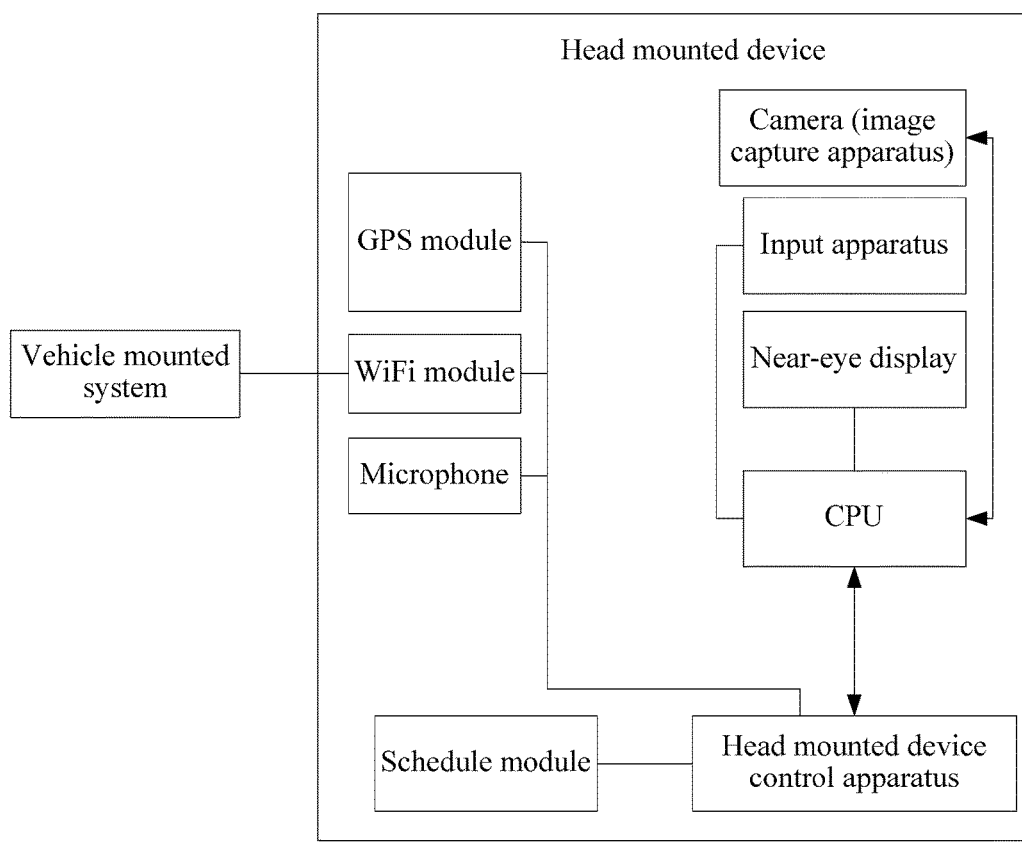
FIG. 27 is a schematic structural diagram of a head mounted device according to an embodiment of the present disclosure.

FIG. 27 shows a specific structure of the head mounted device.

The embodiments in this specification are all described in a progressive manner, for same or similar parts in the embodiments, reference may be made to these embodiments, and each embodiment focuses on a difference from other embodiments.

Method or algorithm steps described with reference to the embodiments disclosed in this specification may be implemented by hardware, a software module executed by a processor, or a combination thereof. The software module may reside in a RAM, a memory, a read-only memory (ROM), an electrically programmable ROM, an electrically erasable programmable ROM, a register, a hard disk, a removable disk, a compact disc ROM (CD-ROM), or any other form of storage medium known in the art.

The embodiments disclosed above are described to enable a person skilled in the art to implement or use the present disclosure. Various modifications to the embodiments are obvious to the person skilled in the art, and general principles defined in this specification may be implemented in other embodiments without departing from the spirit or scope of the present disclosure. Therefore, the present disclosure is not intended to be limited to these embodiments illustrated in this specification, but shall be construed in the widest scope consistent with the principles and novel features disclosed in this specification.

What is claimed is:

1. A head mounted device control method, comprising:
    using captured status data to determine a status of a wearer of the head mounted device, wherein the status comprises a driving state and a non-driving state;
    disabling a preset service when the wearer is in the driving state, wherein the preset service comprises at least one of a screen display service of a near-eye display, a manual input service, and a projection and display service, wherein the captured status data comprises situation data and an environmental image, and wherein the situation data comprises at least one type of moving speed data, signal strength data of a vehicle mounted wireless network, user schedule data, and environmental noise strength data; and
    substituting the situation data into a situation evaluation function to obtain a situation evaluation value,
    wherein using the captured status data to determine the status of the wearer of the head mounted device comprises:
        using the situation data to determine whether the wearer of the head mounted device is inside a moving vehicle;
        using the environmental image to determine whether a seat taken by the wearer is a driver's seat when the wearer is inside the moving vehicle; and
        determining that the wearer of the head mounted device is in the driving state when the wearer is inside the moving vehicle and the seat taken is the driver's seat,
    wherein using the situation data to determine whether the wearer is inside the moving vehicle comprises:
        determining whether the situation evaluation value is greater than or equal to a threshold;
        determining that the wearer is inside the moving vehicle when the situation evaluation value is greater than or equal to the threshold; and
        determining that the wearer is not inside the moving vehicle when the situation evaluation value is less than the threshold,
    wherein the situation evaluation function is denoted by $F(x,y,z,v)$ and comprises at least one of a signal strength evaluation function $f_1(x)$, a schedule evaluation function $f_2(y)$, an environmental noise evaluation function $f_3(z)$, and a moving speed evaluation function $f_4(v)$, wherein x indicates the signal strength data, wherein y indicates the user schedule data, wherein z indicates the environmental noise strength data, wherein v indicates the moving speed data,
    wherein substituting the situation data into the situation evaluation function to obtain the situation evaluation value comprises at least one of the following:
        substituting x into $f_1(x)$ to obtain a signal strength evaluation value;
        substituting y into $f_2(y)$ to obtain a schedule evaluation value;
        substituting z into $f_3(z)$ to obtain an environmental noise strength evaluation value; and
        substituting v into $f_4(v)$ to obtain a moving speed evaluation value,
    wherein $f_1(x)=\alpha_1 x$, wherein $\alpha_1$ indicates a signal strength weight and $\alpha_1>0$, wherein $$f_2(y) = \begin{cases} 0, & y \cap \Omega = \emptyset \\ \alpha_2, & y \cap \Omega \neq \emptyset \end{cases},$$

wherein $\alpha_2$ indicates a schedule weight and $\alpha_2>0$, wherein y comprises a schedule event set at a data capture time, wherein $\Omega$ indicates a preset specific event set, wherein $f_3(z)=\alpha_3 z$, wherein $\alpha_3$ indicates an environmental noise strength weight and $\alpha_3>0$, wherein $$f_4(v) = \begin{cases} \beta_1 v + t_1, & v < v_0 \\ \beta_2 v + t_2, & v \geq v_0 \end{cases},$$

wherein $v_0$ indicates a speed threshold, wherein $\beta_1$ indicates a first moving speed weight, wherein $\beta_2$ indicates a second moving speed weight, wherein $t_1$ indicates a first speed minimum impact value, wherein $t_2$ indicates a second speed minimum impact value, wherein $\beta_2 \geq \beta_1 > 0$, and wherein $t_2 \geq t_1 > 0$.

2. The method according to claim 1, wherein the environmental image is captured by:
    setting photographing parameters; and
    performing photographing to obtain the environmental image,
    wherein the photographing parameters are determined according to the moving speed data or are preset standard photographing parameters, wherein using the captured environmental image to determine whether the seat taken by the wearer is the driver's seat comprises determining whether the seat taken by the wearer is the driver's seat by:
  detecting whether the environmental image comprises a preset mark; or
  calculating a similarity between the captured environmental image and a preset standard environmental image,
wherein the seat taken by the wearer is the driver's seat when the environmental image comprises the preset mark,
wherein the seat taken by the wearer is not the driver's seat when it is detected that the environmental image does not comprise the preset mark,
wherein the seat taken by the wearer is the driver's seat when the calculated similarity between the captured environmental image and the preset standard environmental image is greater than or equal to a similarity threshold, and
wherein the seat taken by the wearer is not the driver's seat when the calculated similarity between the captured environmental image and the preset standard environmental image is less than the similarity threshold.

3. A head mounted device control apparatus, comprising:
a memory configured to store instructions; and
a processor, wherein the instructions are executed by the processor to cause the head mounted device control apparatus to:
  use captured status data to determine a status of a wearer of the head mounted device, wherein the status comprises a driving state and a non-driving state;
  disable a preset service when the wearer is in the driving state, wherein the preset service comprises at least one of a screen display service of a near-eye display, a manual input service, and a projection and display service, wherein the captured status data comprises situation data and an environmental image, and wherein the situation data comprises at least one type of moving speed data, signal strength data of a vehicle mounted wireless network, user schedule data, and environmental noise strength data;
  use the situation data to determine whether the wearer of the head mounted device is inside a moving vehicle;
  use the environmental image to determine whether a seat taken by the wearer is a driver's seat when the wearer is inside the moving vehicle;
  determine that the wearer of the head mounted device is in the driving state when the wearer is inside the moving vehicle and the seat taken is the driver's seat;
  substituting the situation data into a situation evaluation function to obtain a situation evaluation value;
  determine whether the situation evaluation value is greater than or equal to a threshold;
  determine that the wearer is inside the moving vehicle when the situation evaluation value is greater than or equal to the threshold; and
  determine that the wearer is not inside the moving vehicle when the situation evaluation value is less than the threshold,
wherein the situation evaluation function is denoted by $F(x,y,z,v)$ and comprises at least one of a signal strength evaluation function $f_1(x)$, a schedule evaluation function $f_2(y)$, an environmental noise evaluation function $f_3(z)$, and a moving speed evaluation function $f_4(v)$, wherein x indicates the signal strength data, wherein y indicates the user schedule data, wherein z indicates the environmental noise strength data, wherein v indicates the moving speed data,
wherein substituting the situation data into the situation evaluation function to obtain the situation evaluation value comprises at least one of the following:
  substituting x into $f_1(x)$ to obtain a signal strength evaluation value;
  substituting y into $f_2(y)$ to obtain a schedule evaluation value;
  substituting z into $f_3(z)$ to obtain an environmental noise strength evaluation value; and
  substituting v into $f_4(v)$ to obtain a moving speed evaluation value,
wherein $f_1(x)=\alpha_1 x$, wherein $\alpha_1$ indicates a signal strength weight and $\alpha_1>0$, wherein $$f_2(y) = \begin{cases} 0, & y \cap \Omega = \emptyset \\ \alpha_2, & y \cap \Omega \neq \emptyset \end{cases},$$

wherein $\alpha_2$ indicates a schedule weight and $\alpha_2>0$, wherein y comprises a schedule event set at a data capture time, wherein $\Omega$ indicates a preset specific event set, wherein $f_3(z)=\alpha_3 z$, wherein $\alpha_3$ indicates an environmental noise strength weight and $\alpha_3>0$, wherein $$f_4(v) = \begin{cases} \beta_1 v + t_1, & v < v_0 \\ \beta_2 v + t_2, & v \geq v_0 \end{cases},$$

wherein $v_0$ indicates a speed threshold, wherein $\beta_1$ indicates a first moving speed weight, wherein $\beta_2$ indicates a second moving speed weight, wherein $t_1$ indicates a first speed minimum impact value, wherein $t_2$ indicates a second speed minimum impact value, wherein $\beta_2 \geq \beta_1 > 0$, and wherein $t_2 \geq t_1 > 0$.

4. The head mounted device control apparatus according to claim 3, wherein the instructions are further executed by the processor to cause the head mounted device control apparatus to:
set photographing parameters;
perform photographing to obtain the environmental image, wherein the photographing parameters are determined according to the moving speed data or are preset standard photographing parameters; and
determine whether a seat taken by the wearer is a driver's seat by:
  detecting whether the environmental image comprises a preset mark; or
  calculating a similarity between the captured environmental image and a preset standard environmental image,
wherein the seat taken by the wearer is the driver's seat when the environmental image comprises the preset mark,
wherein the seat taken by the wearer is not the driver's seat when it is detected that the environmental image does not comprise the preset mark,
wherein the seat taken by the wearer is the driver's seat when the calculated similarity between the captured environmental image and the preset standard environmental image is greater than or equal to a similarity threshold, and wherein the seat taken by the wearer is not the driver's seat when the calculated similarity between the captured environmental image and the preset standard environmental image is less than the similarity threshold.

* * * * *